US011577995B2

(12) United States Patent
Kanaya et al.

(10) Patent No.: US 11,577,995 B2
(45) Date of Patent: Feb. 14, 2023

(54) FIBER-SIZING AGENT, INORGANIC REINFORCEMENT MATERIAL, RESIN COMPOSITION, AND MOLDED ARTICLE

(71) Applicant: MITSUI CHEMICALS, INC., Tokyo (JP)

(72) Inventors: Hirotaka Kanaya, Chiba (JP); Kuniaki Kawabe, Chiba (JP); Yosuke Takahashi, Ichihara (JP); Koji Matsunaga, Yokohama (JP); Masaya Kusumoto, Sodegaura (JP); Takuya Tamura, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 322 days.

(21) Appl. No.: 16/642,281

(22) PCT Filed: Aug. 22, 2018

(86) PCT No.: PCT/JP2018/030999
§ 371 (c)(1),
(2) Date: Feb. 26, 2020

(87) PCT Pub. No.: WO2019/044626
PCT Pub. Date: Mar. 7, 2019

(65) Prior Publication Data
US 2021/0078901 A1 Mar. 18, 2021

(30) Foreign Application Priority Data

Aug. 29, 2017 (JP) .............................. JP2017-164633

(51) Int. Cl.
| | | |
|---|---|---|
| *C03C 25/30* | (2018.01) | |
| *C03C 25/255* | (2018.01) | |
| *C03C 25/40* | (2006.01) | |
| *C08L 23/26* | (2006.01) | |
| *C08L 91/06* | (2006.01) | |
| *D06M 15/227* | (2006.01) | |

(52) U.S. Cl.
CPC ............ *C03C 25/255* (2018.01); *C03C 25/30* (2013.01); *C03C 25/40* (2013.01); *C08L 23/26* (2013.01); *C08L 91/06* (2013.01); *D06M 15/227* (2013.01)

(58) Field of Classification Search
CPC ....... C03C 25/255; C03C 25/30; C03C 25/40; C03C 25/1095; C08L 23/26; C08L 91/06; C08L 23/00; C08L 23/04; C08L 101/00; D06M 15/227; D06M 2101/40; D06M 13/513; D06M 15/263; C08J 2369/00; C08J 5/08; C08J 5/042; C08K 7/14; C08K 9/08; C08K 5/54; C08K 7/06; C09D 191/06
USPC ......................................................... 523/206
See application file for complete search history.

(56) References Cited

U.S. PATENT DOCUMENTS

| | | | |
|---|---|---|---|
| 10,414,915 B2 * | 9/2019 | Kanaya .................... C08K 5/01 |
| 2011/0104503 A1 * | 5/2011 | Machida ............... C08F 110/06 | 428/458 |
| 2011/0257325 A1 * | 10/2011 | Asami ................... C08L 23/142 | 524/522 |

FOREIGN PATENT DOCUMENTS

| | | |
|---|---|---|
| CN | 104045244 A | 9/2014 |
| EP | 1 460 166 A1 | 9/2004 |
| JP | S62-12814 B2 | 3/1987 |
| JP | H07-238213 A | 9/1995 |
| JP | H08-188708 A | 7/1996 |
| JP | H09-227173 A | 9/1997 |
| JP | 2003-183563 A | 7/2003 |
| JP | 2003-201150 A | 7/2003 |
| JP | 2004-263359 A | 9/2004 |
| JP | 2005-170691 A | 6/2005 |
| JP | 2005-289698 A | 10/2005 |
| JP | 2009-256655 A | 11/2009 |
| JP | 2013-184879 A | 9/2013 |

OTHER PUBLICATIONS

Machine Translation of JP 2005-170691. (Year: 2005).*
International Searching Authority, "International Search Report," issued in connection with International Patent Application No. PCT/JP2018/030999, dated Nov. 6, 2018.
International Searching Authority, "Written Opinion," issued in connection with International Patent Application No. PCT/JP2018/030999, dated Nov. 6, 2018.

* cited by examiner

*Primary Examiner* — Hannah J Pak
(74) *Attorney, Agent, or Firm* — Foley & Lardner LLP

(57) ABSTRACT

The purpose of the present invention is to provide a fiber-sizing agent which when applied to an inorganic reinforcement material contained in a resin composition, can provide a molded article having excellent impact resistance and high surface gloss properties. The fiber-sizing agent according to the present invention contains a modified olefin wax (A), a polyolefin resin (B), and a silane-coupling agent (C), wherein the mass ratio (A)/(B) of the modified olefin wax (A) to the polyolefin resin (B) is in the range of 0.2-10.

10 Claims, No Drawings

FIBER-SIZING AGENT, INORGANIC REINFORCEMENT MATERIAL, RESIN COMPOSITION, AND MOLDED ARTICLE

RELATED APPLICATIONS

The present application claims priority under 37 U.S.C. § 371 to International Patent Application No. PCT/JP2018/030999, filed Aug. 22, 2018, which claims priority to and the benefit of Japanese Patent Application No. 2017-164633, filed on Aug. 29, 2017. The contents of these applications are hereby incorporated by reference in their entireties.

TECHNICAL FIELD

The present invention relates to a fiber-sizing agent having a specific composition, an inorganic reinforcing material coated with the fiber-sizing agent, a resin composition containing the inorganic reinforcing material, and a molded article.

BACKGROUND ART

Thermoplastic resins or thermosetting resins such as polycarbonate resins, thermoplastic polyester resins, ABS resins, polyacetal resins, polyimide resins, polyimide resins, polyphenylene oxide resins, epoxy resins, thermosetting unsaturated polyester resins and phenol resins have a high melting point or softening point, and excellent mechanical properties, and are therefore widely used in various industry fields such as automobile industry fields and electric and electronic industry fields.

For enhancing the stiffness and heat resistance of these thermoplastic resins or thermosetting resins, inorganic reinforcing materials such as glass fiber and carbon fiber have been incorporated. However, thermoplastic resin compositions or thermosetting resin compositions containing an inorganic reinforcing material have the following problem: high impact resistance specific to thermoplastic resins or thermosetting resins is impaired.

For solving such a problem caused by incorporation of inorganic reinforcing materials, an olefin wax having carboxyl groups and/or carboxyl derivative groups (see Patent Literatures 1 to 3), and further a composite rubber-based graft copolymer (see Patent Literature 2) have been incorporated in a resin composition. However, even when such ingredients are incorporated, there may be the problem of reduced impact resistance or poor appearance such as poor surface gloss properties, or stiffness may be insufficient. Thus, addition of a silicon-modified oil wax has been proposed (see Patent Literature 4).

On the other hand, an inorganic reinforcing material is coated with a fiber-sizing agent for developing the sizing properties of the inorganic reinforcing material and the dispersibility of the inorganic reinforcing material in resin during molding. A small amount of wax is incorporated in a fiber-sizing agent for imparting lubricity, and studies focusing on impact resistance or appearance such as surface gloss properties have not been conducted (see Patent Literatures 5 and 6).

CITATION LIST

Patent Literature

PTL 1
Japanese Patent Application Laid-Open No. H8-188708
PTL 2
Japanese Patent Application Laid-Open No. H7-238213
PTL 3
Japanese Examined Patent Application Publication No. S62-12814
PTL 4
Japanese Patent Application Laid-Open No. 2009-256655
PTL 5
Japanese Patent Application Laid-Open No. H9-227173
PTL 6
Japanese Patent Application Laid-Open No. 2003-201150

SUMMARY OF INVENTION

Technical Problem

The present invention has been made in view of the above circumstances, and an object of the present invention is to provide a fiber-sizing agent which can provide a molded article having excellent impact resistance and high surface gloss properties when the fiber-sizing agent is applied to an inorganic reinforcing material contained in a resin composition; an inorganic reinforcing material obtained using the fiber-sizing agent; and a resin composition obtained using the inorganic reinforcing material.

Solution to Problem

The present inventors have extensively conducted studies for solving the above problems, and resultantly found that the above problems can be solved by using a fiber-sizing agent having a specific composition. In this way, the present invention has been completed.

Specifically, the present invention relates to the following items [1] to [11].

[1] A fiber-sizing agent comprising a modified olefin wax (A), a polyolefin resin (B) and a silane coupling agent (C), wherein a mass ratio (A)/(B) of the modified olefin wax (A) to the polyolefin resin (B) is in the range of 0.2 to 10.

[2] The fiber-sizing agent according to [1], wherein the mass ratio (A)/(B) is in the range of 0.5 to 10.

[3] The fiber-sizing agent according to [1] or [2], wherein the modified olefin wax (A) meets the following requirements (i) to (iv):

(i) a number average molecular weight (Mn) in terms of polystyrene as measured by gel permeation chromatography (GPC) is in the range of 300 to 20,000;

(ii) a softening point measured according to JIS K2207 is in the range of 70 to 170° C.;

(iii) a density measured by a density-gradient tube method is in the range of 830 to 1200 kg/m$^3$; and (iv) an acid value is in the range of 10 to 200 mgKOH/g.

[4] The fiber-sizing agent according to any one of [1] to [3], wherein the modified olefin wax (A) is a carboxylic acid-modified product of an unmodified olefin wax (a) or an oxide of an unmodified olefin wax (a).

[5] The fiber-sizing agent according to any one of [1] to [4], wherein the modified olefin wax (A) is a maleic anhydride-modified product of an unmodified olefin wax (a).

[6] The fiber-sizing agent according to any one of [1] to [5], wherein the modified olefin wax (A) is contained as a water-dispersible emulsion having an average particle diameter of 0.1 to 30 μm.

[7] The fiber-sizing agent according to any one of [1] to [6], wherein the modified olefin wax (A) meets the following requirement (i)':

(i)' the number average molecular weight (Mn) in terms of polystyrene as measured by gel permeation chromatography (GPC) is in the range of 300 to 10,000.

[8] The fiber-sizing agent according to [4] or [5], wherein the unmodified olefin wax (a) and the polyolefin resin (B) are each an ethylene-based polymer.

[9] An inorganic reinforcing material (D) in which an inorganic reinforcing material (D') is coated with the fiber-sizing agent according to any one of [1] to [8].

[10] The inorganic reinforcing material (D) according to [9], wherein the inorganic reinforcing material (D') is a glass fiber filament, and the inorganic reinforcing material (D) is a glass fiber strand in which a plurality of the glass fiber filaments are sized by the fiber-sizing agent.

[11] The inorganic reinforcing material (D) according to [9], wherein the inorganic reinforcing material (D') is a carbon fiber filament, and the inorganic reinforcing material (D) is a carbon fiber strand in which a plurality of the carbon fiber filaments are sized by the fiber-sizing agent.

[12] A resin composition comprising the inorganic reinforcing material (D) according to any one of [9] to [11], and a resin (E).

[13] The resin composition according to [12], wherein the resin (E) includes a thermoplastic resin selected from the group consisting of a polycarbonate resin, a polyester resin, a polyacetal resin, a polyamide resin, a polyimide resin and a polyphenylene oxide resin, or a thermosetting resin selected from the group consisting of an epoxy resin, an unsaturated polyester resin and a phenol resin.

[14] A molded article obtained from the resin composition according to [12] or [13].

Advantageous Effects of Invention

According to the present invention, it is possible to provide a fiber-sizing agent which can provide a molded article having excellent impact resistance and high surface gloss properties when the fiber-sizing agent is applied to an inorganic reinforcing material in a resin composition; an inorganic reinforcing material obtained using the fiber-sizing agent; and a resin composition obtained using the inorganic reinforcing material.

DESCRIPTION OF EMBODIMENTS

Hereinafter, a fiber-sizing agent, an inorganic reinforcing material (D), a resin composition and a molded article according to the present invention will be described in detail.

1. Fiber-Sizing Agent

The fiber-sizing agent of the present invention contains a modified olefin wax (A), a polyolefin resin (B) and a silane coupling agent (C). The fiber-sizing agent of the present invention is normally in the form of a water-dispersible emulsion. The fiber-sizing agent can be obtained by mixing a water-dispersible emulsion of the modified olefin wax (A), a water-dispersible emulsion of the polyolefin resin (B) and the silane coupling agent (C) as described later. Alternatively, the fiber-sizing agent can be obtained by mixing the silane coupling agent (C) with a water-dispersible emulsion obtained by emulsifying a mixture of the modified olefin wax (A) and the polyolefin resin (B) as described later.

1-1. Modified Olefin Wax

The modified olefin wax (A) can be obtained by carboxylic acid modification or oxidative modification of an unmodified olefin wax (a).

The modified olefin wax (A) normally meets the following requirements (i) to (iv).

(i) The number average molecular weight (Mn) in terms of polystyrene as measured by gel permeation chromatography (GPC) is in the range of 300 to 20,000.

The number average molecular weight (Mn) and the weight average molecular weight (Mw) can be determined by GPC measurement. The number average molecular weight (Mn) measured by gel permeation chromatography (GPC) is in the range of, for example 300 to 20,000, preferably 300 to 10,000 (requirement (i)'), more preferably 300 to 3,000, particularly preferably 300 to 2,000. When the number average molecular weight (Mn) of the modified olefin wax (A) is within the above range, not only a water-dispersible emulsion is easily formed but also the water-dispersible emulsion has a smaller average particle diameter, and therefore the coverage over the inorganic reinforcing material (D) is easily increased. Accordingly, the slipping properties of the inorganic reinforcing material (D) coated with the fiber-sizing agent are easily enhanced, so that breakage of the inorganic reinforcing material (D) during molding is easily suppressed. The dispersibility of the inorganic reinforcing material (D) in the resin composition is further enhanced, so that impact resistance and surface gloss properties of the molded article of the resin composition are further improved.

The ratio of the weight average molecular weight and the number average molecular weight (Mw/Mn) of the modified olefin wax (A) as measured by GPC is in the range of for example 1.5 to 5.5, preferably 1.5 to 4.0, more preferably 1.5 to 3.0, particularly preferably 1.5 to 2.0. When the ratio of the weight average molecular weight and the number average molecular weight (Mw/Mn) of the modified olefin wax (A) is within the above range, not only a water-dispersible emulsion is easily formed but also the water-dispersible emulsion has a narrow particle size distribution, and therefore the coverage over the inorganic reinforcing material (D) is further increased. Accordingly, the slipping properties of the inorganic reinforcing material (D) coated with the fiber-sizing agent are further enhanced, so that breakage of the inorganic reinforcing material (D) during molding is further suppressed. The dispersibility of the inorganic reinforcing material (D) in the resin composition is further enhanced, so that impact resistance and surface gloss properties of the molded article of the resin composition are further improved.

GPC measurement of a molecular weight can be performed under the following conditions. The weight average molecular weight (Mw) and the number average molecular weight (Mn) can be determined on the basis of the following calculation method with a standard curve prepared using commercially available monodisperse polystyrene.

Apparatus: Gel Permeation Chromatograph Alliance Model GPC 2000 (manufactured by Waters Corporation)

Solvent: o-dichlorobenzene

Columns: two TSKgel GMH6-HT columns and two TSKgel GMH6-HTL columns (each manufactured by TOSOH CORPORATION)

Flow rate: 1.0 ml/min

Sample: 0.15 mg/mL o-dichlorobenzene solution

Temperature: 140° C.

Molecular weight conversion: in terms of PE/generalized calibration method

For calculation in generalized calculation, coefficients in the Mark-Houwink viscosity equation are used. As Mark-Houwink coefficients for PS and PE, values described in the document (J. Polym. Sci., Part A-2, 8, 1803 (1970), Makromol. Chem., 177, 213 (1976)) are used.

The limiting viscosity [η] of the modified olefin wax (A) as measured in decalin at 135° C. is in the range of for example 0.04 to 0.47 dl·g$^{-1}$, preferably 0.04 to 0.30 more preferably 0.04 to 0.20 dl·g$^{-1}$, still more preferably 0.05 to 0.18 dl·g$^{-1}$. When the limiting viscosity [η] of the modified olefin wax (A) is within the above range, not only a water-dispersible emulsion is easily formed but also the water-dispersible emulsion has a smaller average particle diameter, and therefore the coverage over the inorganic reinforcing material (D) is further increased. Accordingly, the slipping properties of the inorganic reinforcing material (D) coated with the fiber-sizing agent are further enhanced, so that breakage of the inorganic reinforcing material (D) during molding is further suppressed. The dispersibility of the inorganic reinforcing material (D) in the resin composition is further enhanced, so that impact resistance and surface gloss properties are further improved.

(ii) The softening point measured according to JIS K2207 is in the range of 70 to 170° C.

The softening point of the modified olefin wax (A) as measured according to JIS K2207 is in the range of 70 to 170° C., preferably 75 to 160° C., more preferably 80 to 150° C., particularly preferably 90 to 140° C. When the softening point of the modified olefin wax (A) is within the above range, not only a water-dispersible emulsion is easily formed but also the fiber-sizing agent has better leveling properties, and therefore the coverage over the inorganic reinforcing material (D) is further increased. Accordingly, the slipping properties of the inorganic reinforcing material (D) coated with the fiber-sizing agent are further enhanced, so that breakage of the inorganic reinforcing material (D) during molding is further suppressed. The heat resistance of the resin composition is further enhanced.

The melting point of the modified olefin wax (A) as measured by a differential scanning calorimeter (DSC) is in the range of for example 60 to 160° C., preferably 70 to 150° C., more preferably 80 to 140° C., particularly preferably 90 to 130° C. When the melting point of the modified olefin wax (A) is within the above range, not only a water-dispersible emulsion is easily formed but also the fiber-sizing agent has good leveling properties, and therefore the coverage over the inorganic reinforcing material (D) is further increased. Accordingly, the slipping properties of the inorganic reinforcing material (D) coated with the fiber-sizing agent are further enhanced, so that breakage of the inorganic reinforcing material (D) during molding is further suppressed. The heat resistance of the resin composition is further enhanced.

(iii) The density measured by a density-gradient tube method is in the range of 830 to 1200 kg/m$^3$.

The density of the modified olefin wax (A) as measured by a density-gradient tube method is in the range of 830 to 1,200 kg/m$^3$, preferably 850 to 1,100 kg/m$^3$, more preferably 880 to 1,000 kg/m$^3$, particularly preferably 900 to 950 kg/m$^3$. When the density of the modified olefin wax (A) is in the above range, the density is close to that of water, and therefore the stability of the water-dispersible emulsion is easily stabilized. Accordingly, the slipping properties of the inorganic reinforcing material (D) coated with the fiber-sizing agent are further enhanced, so that breakage of the inorganic reinforcing material (D) during molding is further suppressed. The density of the modified olefin wax (A) can be measured according to JIS K 7112.

The penetration hardness of the modified olefin wax (A) is for example 30 dmm (dmm=0.1 mm) or less, preferably 20 dmm or less, particularly preferably 15 dmm or less. The penetration hardness can be measured according to JIS K2207. When the penetration hardness of the modified olefin wax (A) is within the above range, the slipping properties of the inorganic reinforcing material (D) are further enhanced, so that breakage of the inorganic reinforcing material (D) during molding is further suppressed.

(iv) The acid value is in the range of 10 to 200 mgKOH/g.

A preferred acid value range will be described later in each of cases where the modified olefin wax (A) is an acid-modified olefin wax (A1) and where the modified olefin wax (A) is an oxidized olefin wax (A2).

The modified olefin wax (A) is the acid-modified olefin wax (A1) obtained by carboxy acid modification of the unmodified olefin wax (a) or the oxidized olefin wax (A2) obtained by oxidative modification of the unmodified olefin wax (a) as described above. Since the unmodified olefin wax (a) is preferably an ethylene-based polymer as described later, the modified olefin wax (A) may be preferably a modified polyethylene wax. The unmodified olefin wax (a) will be described, followed by describing each of the acid-modified olefin wax (A1) and the oxidized olefin wax (A2).

1-1-1. Unmodified Olefin Wax (a)

Examples of the unmodified olefin wax (a) include polyethylene wax and polypropylene wax. The unmodified olefin wax (a) may be a low-molecular-weight polyolefin itself obtained by polymerizing an olefin, or a low-molecular-weight polyolefin obtained by thermally cracking a polymerized high-molecular-weight polyolefin to reduce the molecular weight. The unmodified olefin wax (a) is particularly preferably a low-molecular-weight polyolefin obtained by polymerizing an olefin.

The low-molecular-weight polyolefin obtained by polymerizing an olefin can be produced by any of previously known methods. For example, an olefin may be polymerized using a titanium-based catalyst, a vanadium-based catalyst, a metallocene catalyst or the like.

In particular, the unmodified olefin wax (a) is more preferably an ethylene-based polymer, that is, an ethylene homopolymer or a copolymer of ethylene and an α-olefin having 3 to 20 carbon atoms because the wax after modification has high slipping properties and impact resistance.

The α-olefin may be linear or branched, and may be substituted or unsubstituted. The α-olefin is preferably an α-olefin having 3 to 10 carbon atoms, more preferably propylene having 3 carbon atoms, 1-butene having 4 carbon atoms, 1-pentene having 5 carbon atoms, 1-hexane having 6 carbon atoms, 4-methyl-1-penetene, 1-octene having 8 carbon atoms, or the like, further preferably propylene, 1-butene, 1-hexene or 4-methyl-1-penetene. The α-olefin is particularly preferably propylene or 1-butene from the viewpoint of a crystallinity degree. The content of ethylene-derived structural units in the ethylene-based polymer is preferably 50 to 100 mol %, more preferably 70 to 100 mol %, further preferably 80 to 100 mol %, particularly preferably 90 to 100 mol %, based on the total of all monomers forming the ethylene-based polymer.

The unmodified olefin wax (a) may be in the form of any of resin and elastomer. A polyolefin having either an isotactic structure or a syndiotactic structure as a steric structure can be used, and there is no particular limitation on stereoregularity. A commercially available unmodified olefin wax may be used as it is.

The number average molecular weight (Mn) and the weight average molecular weight (Mw) of the unmodified olefin wax (a) can be determined by GPC measurement. The number average molecular weight (Mn) measured by gel permeation chromatography (GPC) is in the range of normally 300 to 20,000, preferably 300 to 10,000, more preferably 300 to 3,000, particularly preferably 300 to 2,000. When the number average molecular weight (Mn) of the unmodified olefin wax (a) is in the above range, it is easy for the resulting modified olefin wax (A) to meet the aforementioned requirement (i).

The ratio of the weight average molecular weight and the number average molecular weight (Mw/Mn) of the unmodified olefin wax (a) as measured by GPC is in the range of for example 1.5 to 5.5, preferably 1.5 to 4.0, more preferably 1.5 to 3.0, particularly preferably 1.5 to 2.0. GPC measurement of the molecular weight can be performed under the same conditions as in the case of the modified olefin wax (A).

The limiting viscosity [η] of the unmodified olefin wax (a) as measured in decalin at 135° C. is in the range of normally 0.04 to 0.47 $dl \cdot g^{-1}$, preferably 0.04 to 0.30 $dl \cdot g^{-1}$, more preferably 0.04 to 0.20 $dl \cdot g^{-1}$, still more preferably 0.05 to 0.18 $dl \cdot g^{-1}$.

The softening point of the unmodified olefin wax (a) as measured according to JIS K2207 is in the range of for example 70 to 170° C., preferably 75 to 160° C., more preferably 80 to 150° C., particularly preferably 90 to 140° C. When the softening point of the unmodified olefin wax (a) is within the above range, it is easy for the resulting modified olefin wax (A) to meet the aforementioned requirement (ii).

The melting point of the unmodified olefin wax (a) as measured by a differential scanning calorimeter (DSC) is in the range of for example 60 to 160° C., preferably 70 to 150° C., more preferably 80 to 140° C., particularly preferably 90 to 130° C.

The density of the unmodified olefin wax (a) as measured by a density-gradient tube method is in the range of for example 830 to 1,200 $kg/m^3$, preferably 850 to 1,100 $kg/m^3$, more preferably 880 to 1,000 $kg/m^3$, particularly preferably 900 to 950 $kg/m^3$. When the density of the unmodified olefin wax (a) is within the above range, it is easy for the resulting modified olefin wax (A) to meet the aforementioned requirement (iii).

The penetration hardness of the unmodified olefin wax (a) is for example 30 dmm (dmm=0.1 mm) or less, preferably 20 dmm or less, particularly preferably 15 dmm or less. The penetration hardness can be measured according to JIS K2207.

1-1-2. Acid-Modified Olefin Wax (A1)

A first aspect of the modified olefin wax (A) may be an acid-modified olefin wax (A1) from the unmodified olefin wax (a). The acid-modified olefin wax (A1) has carboxyl groups and/or carboxyl derivative groups. The carboxyl group and/or the carboxyl derivative group may be bonded to any moiety of the acid-modified olefin wax (A1). The content ratio of carboxyl groups and/or carboxyl derivative groups in the acid-modified olefin wax (A1) is normally expressed as an acid value. The acid value of the acid-modified olefin wax (A1) is not particularly limited, and is in the range of for example 10 to 200 mgKOH/g, preferably 10 to 150 mgKOH/g, more preferably 10 to 100 mgKOH/g, particularly preferably 10 to 70 mgKOH/g. When the acid value of the acid-modified olefin wax (A1) is within the above range, not only a water-dispersible emulsion is easily formed but also the water-dispersible emulsion is apt to have a small average particle diameter. That is, when the acid value is below a certain level, the modified olefin wax (A) does not have an excessively high melt viscosity, and is therefore easily emulsified, and when the acid value is above a certain level, hydrophilicity is unlikely to be impaired. Therefore, in either case, the average particle size is apt to be small. Thus, the coverage over the inorganic reinforcing material (D) is further increased. Accordingly, the slipping properties of the inorganic reinforcing material (D) coated with the fiber-sizing agent are further enhanced, so that breakage of the inorganic reinforcing material (D) during molding is further suppressed. The dispersibility of the inorganic reinforcing material (D) in the resin composition is further enhanced, so that impact resistance and surface gloss properties are further improved. The acid value of the acid-modified olefin wax (A1) can be measured according to JIS K5902.

The acid-modified olefin wax (A1) can be obtained by modifying the unmodified olefin wax (a) with a compound having carboxyl groups and/or carboxyl derivative groups. Examples of the carboxyl derivative groups include carboxylic anhydride groups, salts of carboxylic acids, and carboxylic acid alkyl ester groups and aryl ester groups.

Examples of the compound having carboxyl groups and/or carboxyl derivative groups include unsaturated compounds having one or more carboxylate groups, unsaturated compounds having one or more carboxylic anhydride groups, and derivatives thereof. Examples of the unsaturated group include vinyl groups, vinylene groups and unsaturated cyclic hydrocarbon groups.

Specific examples of the compound having carboxyl groups and/or carboxyl derivative groups include unsaturated carboxylic acid such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hepto-2-ene-5, 6-dicarboxylic acid, or acid anhydrides thereof or derivatives (for example halides, amides, imides, esters and the like) thereof. Further, specific examples of the compound include malonyl chloride, maleimide, maleic anhydride, itaconic anhydride, citraconic anhydride, tetrahydrophthalic anhydride, bicyclo[2,2,1]hepto-2-ene-5,6-dicarboxylic anhydride, monomethyl maleate, hydroxyethyl (meth)acrylate and hydroxypropyl (meth)acrylate.

Further preferred examples of the compound having carboxyl groups and/or carboxyl derivative groups include maleic anhydride, (meth)acrylic acid, itaconic anhydride, citraconic anhydride, tetrahydrophthalic anhydride, bicyclo [2,2,1]hepto-2-ene-5,6-dicarboxylic anhydride and hydroxyethyl (meth)acrylate. Further, dicarboxylic anhydrides such as maleic anhydride, itaconic anhydride, citraconic anhydride, tetrahydrophthalic anhydride and bicyclo [2,2,1]hepto-2-ene-5,6-dicarboxylic anhydride are particularly preferable. The compounds having carboxyl groups and/or carboxyl derivative groups can be used singly, or used in combination of two or more thereof.

The acid-modified olefin wax (A1) may be a commercialized product. Examples of the commercialized acid-modified olefin wax (A1) include DIACARNA PA30 (Mitsubishi Chemical Corporation), Hi-WAX 2203A and 1105A (acid-modified types) (Mitsui Chemicals, Incorporated) and Oxidized Paraffin (NIPPON SEIRO CO., LTD.).

The acid-modified olefin wax (A1) may be modified with a styrene-based monomer together with the compound having carboxyl groups and/or carboxyl derivative groups. Examples of the styrene-based monomer include styrene, methylstyrene, ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene. Among them, styrene is preferable from the viewpoint of removing unreacted substances.

The acid-modified olefin wax (A1) is obtained by, for example, subjecting the unmodified olefin wax (a) to graft reaction with the compound having carboxyl groups and/or carboxyl derivative groups, and other necessary modifying monomers (styrene-based monomers and the like).

The method for producing the acid-modified olefin wax (A1) is not particularly limited, and previously known various methods can be used. The unmodified olefin wax (a), the compound having carboxyl groups and/or carboxyl derivative groups and other necessary modifying monomers (styrene-based monomers and the like), and an organic peroxide are simultaneously or sequentially melt-kneaded to obtain the acid-modified olefin wax (A1).

In melt-kneading, the above materials are put in, for example, a Henschel mixer, a V-shaped blender, a tumbler blender, a ribbon blender or the like, kneaded, and then melt-kneaded by a single-screw extruder, a multi-screw extruder, a kneader, a Banbury mixer or the like. In particular, use of an apparatus excellent in melt-kneading performance of batch type, such as an autoclave, makes it possible to obtain the acid-modified olefin wax (A1) in which the ingredients are more uniformly dispersed and reacted. As compared to the continuous type, the batch type ensures that the residence time is more easily adjusted, and a larger amount of residence time can be taken, so that it is relatively easy to enhance the modification rate and modification efficiency. Thus, the batch type is the most preferable aspect in the present invention.

1-1-3. Oxidized Olefin Wax (A2)

A second aspect of the modified olefin wax (A) may be an oxidized olefin wax (A2) from the unmodified olefin wax (a). The oxidized olefin wax (A2) can be obtained by bringing the unmodified olefin wax (a) into contact with an oxygen-containing gas. The oxygen-containing gas may be pure oxygen (which is obtained by liquid-air fractionation or electrolysis of water, and may contain other ingredients that would be ordinarily contained as impurities in oxygen), or may contain a mixed gas of pure oxygen and other gases, for example air and ozone.

The oxidized olefin wax (A2) has carboxyl groups, carbonyl groups and/or hydroxyl groups. The carboxyl group, carbonyl group and/or hydroxyl group may be bonded to any moiety of the oxidized olefin wax (A2). The content ratio of carboxyl groups, carbonyl groups and/or hydroxyl groups in the oxidized olefin wax (A2) is expressed as an acid value. The acid value of the oxidized olefin wax (A2) is not particularly limited, and is in the range of normally 10 to 200 mgKOH/g, preferably 10 to 100 mgKOH/g, more preferably 10 to 70 mgKOH/g, particularly preferably 10 to 40 mgKOH/g. When the acid value of the oxidized olefin wax (A2) is within the above range, not only a water-dispersible emulsion is easily formed but also the water-dispersible emulsion has a smaller average particle diameter, and therefore the coverage over the inorganic reinforcing material (D) is further increased. Accordingly, the slipping properties of the inorganic reinforcing material (D) coated with the fiber-sizing agent are further enhanced, so that breakage of the inorganic reinforcing material (D) during molding is further suppressed. The dispersibility of the inorganic reinforcing material (D) in the resin composition is further enhanced, so that impact resistance and surface gloss properties are further improved. The acid value of the oxidized olefin wax (A2) can be measured by the same method as described above.

The oxidized olefin wax (A2) may be a commercialized product. Examples of the commercialized oxidized olefin wax (A2) include SANWAX (Sanyo Chemical Industries, Ltd.), PETROLITE (BAKER HUGHES), LICOWAX (CLARIANT) and VISCOWAX (INNOSPEC LEUNA).

The average particle diameter of the modified olefin wax (A) is preferably 0.05 to 50 μm, more preferably 0.1 to 30 μm, and may be 1 to 20 μm. When the average particle diameter of the modified olefin wax (A) is above a certain level, the viscosity of the water-dispersible emulsion decreases, resulting in easy handling, and when the average particle diameter is below a certain level, the coverage over the inorganic reinforcing material (D) is easily increased, and therefore the slipping properties and dispersibility of the inorganic reinforcing material (D) are easily enhanced, so that the impact resistance and surface gloss properties of a molded product of the resin composition can be further improved. Particularly, in the present invention, the mass ratio (A)/(B) is moderately high, that is, the amount of the modified olefin wax (A) is moderately large, so that good fluidity is exhibited. Thus, even when the modified olefin wax (A) has a relatively large average particle diameter, the modified olefin wax (A) is easily wetted on fiber filaments, so that excellent sizing properties are exhibited. The average particle diameter of the modified olefin wax (A) can be measured by a Coulter counter. The average particle diameter can be adjusted by, for example, the polymerization degree.

1-1-4. Method for Emulsifying Modified Olefin Wax (A)

The water-dispersible emulsion of the modified olefin wax (A) in the present invention is one obtained by dispersing the modified olefin wax (A) in water using an emulsifier or a dispersant. Specific examples of the water-dispersible emulsion of the commercialized modified olefin wax (A) include CHEMIPEARL manufactured by Mitsui Chemicals, Incorporated, HIGH-TECH manufactured by TOHO Chemical Industry Co., Ltd., ZAIKTHENE and SEPOLSION manufactured by Sumitomo Seika Chemicals Company, Limited, and JOHNWAX manufactured by JOHNSON POLYMER Co.

The method for producing a water-dispersible emulsion of the modified olefin wax (A) is not particularly limited, and it is preferable to use various emulsification methods. Specific examples thereof include methods in which the modified olefin wax (A) is dissolved in a solvent, the solution is then emulsified by a high-pressure homogenizer, a high-pressure homomixer or the like, and the solvent is then removed; methods in which the modified olefin wax (A) is melted, and emulsified by a high-pressure homogenizer, a high-pressure homomixer or an extrusion kneader; and methods in which the modified olefin wax (A) is mechanically ground, or injected at a high pressure to be ground, or atomized through pores.

Further, for improving the stability of emulsion particles of the modified olefin wax (A), a surfactant that is used for normal emulsion polymerization can be used. Examples of the surfactant include nonionic surfactants, anionic surfactants, cationic surfactants and other reactive surfactants, and these surfactants can be used singly, or used in combination of two or more thereof.

Specific examples of the nonionic surfactants include polyoxyethylene lauryl ether, polyoxyethylene octylphenyl ether, polyoxyethylene oleylphenyl ether, polyoxyethylene nonylphenyl ether, oxyethylene-oxypropylene block copolymers, t-octylphenoxyethyl polyethoxyethanol and nonylphenoxyethyl polyethoxyethanol.

Specific examples of the anionic surfactants include sodium dodecylbenzenesulfonate, sodium lauryl sulfate, sodium alkyl diphenyl ether disulfonates, sodium alkyl naphthalene sulfonates, sodium dialkyl sulfosuccinates, sodium stearate, potassium oleate, sodium dioctyl sulfosuccinate, sodium polyoxyethylene alkyl ether sulfates, sodium polyoxyethylene alkyl phenyl ether sulfates, sodium dialkyl sulfosuccinates, sodium stearate, sodium oleate and sodium t-octylphenoxyethoxypolyethoxyethyl sulfate.

Specific examples of the anionic surfactants include substances which act as a base in water, such as alkali metals, alkaline earth metals, ammonia and amines; substances which act as a base in water, such as oxides, hydroxides, weak acid salts and hydrides of alkali metals and oxides, hydroxides, weak acid salts and hydrides of alkaline earth metals; and alkoxides of these metals. Examples of these substances are shown below.

Examples of the alkali metals include sodium and potassium, examples of the alkaline earth metals include calcium, strontium and barium, examples of the amines include inorganic amines such as hydroxylamine and hydrazine, methylamine, ethylamine, ethanolamine and cyclohexylamine, examples of the oxides, hydroxides and hydrides of alkali metals and alkaline earth metals include sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride and calcium hydride, examples of the weak acid salts of alkali metals and alkaline earth metals include sodium carbonate, potassium carbonate, calcium hydrogencarbonate, sodium carbonate, calcium hydrogencarbonate, sodium acetate, potassium acetate and calcium acetate, and examples of the compounds of ammonia and amines include ammonium hydroxide, and quaternary ammonium compounds, for example tetramethylammonium hydroxide and hydrazine hydrates.

Specific examples of the cationic surfactants include lauryltrimethylammonium chloride and stearyltrimethylammonium chloride.

The content of the modified olefin wax (A) in the fiber-sizing agent is preferably 0.10 to 0.90 parts by mass, more preferably 0.30 to 0.80 parts by mass, based on 100 parts by mass of the fiber-sizing agent. When the content of the modified olefin wax (A) is above a certain level, the amount of the modified olefin wax present on the surface of the inorganic reinforcing material (D) may be moderately large in the resin composition, and therefore good resistance impact is easily imparted to a molded article. When the content of the modified olefin wax (A) is below a certain level, the modified olefin wax (A) is unlikely to bleed out to the surface of the resin composition during molding, and therefore surface gloss properties are unlikely to be impaired.

1-2. Polyolefin Resin (B)

The polyolefin resin (B) can be obtained by polymerizing an olefin using any of previously known methods. An olefin may be polymerized using, for example, a titanium-based catalyst, a vanadium-based catalyst, a metallocene catalyst or the like.

The polyolefin resin (B) is a crystalline or amorphous polyolefin resin, and may contain a diene as desired. The polyolefin resin is a resin which is not the modified olefin wax (A).

Examples of the olefin monomer which forms the polyolefin resin (B) include α-olefins such as propylene, butene-1, pentene-1, hexene-1 and octene-1 in addition to ethylene. These monomers may be used singly, or used in combination of two or more thereof.

Examples of the diene include isoprene, butadiene, dicyclopentadiene, pentadiene-1,4, 2-methyl-pentadiene-1,4, hesadiene-1,4, divinylbenzene, methylidene norbornene and ethylidene norbornene, and these dienes may be used singly, or used in combination of two or more thereof.

The polyolefin resin (B) may be an ethylene-based polymer, that is, a homopolymer of ethylene, or a (rubber-like) copolymer of ethylene and an α-olefin and/or a diene. The content of ethylene in the ethylene-based polymer as measured by $^{13}$C-NMR is in the range of for example 50 to 100 mol %, preferably 60 to 100 mol %, more preferably 70 to 100 mol %, particularly preferably 80 to 100 mol %.

The polyolefin resin (B) may be a propylene-based polymer, that is, a homopolymer of propylene, or a (rubber-like) copolymer of propylene and ethylene and/or a diene. The content of propylene in the propylene-based polymer as measured by $^{13}$C-NMR is in the range of for example 50 to 100 mol %, preferably 60 to 100 mol %, more preferably 70 to 100 mol %, particularly preferably 80 to 100 mol %.

When the content of ethylene or propylene in the polyolefin resin (B) is within the above range, the slipping properties of the inorganic reinforcing material (D) coated with the fiber-sizing agent are further enhanced, so that breakage of the inorganic reinforcing material (D) during molding is further suppressed. The heat resistance of the resin composition is further enhanced.

Specific examples of the polyolefin resin (B) include polyethylene, polypropylene, ethylene-propylene copolymers, ethylene-butene-1 copolymers, propylene-butene-1 copolymers, ethylene-propylene-hexadiene-1,4 copolymers, ethylene-propylene-dicyclopentadiene copolymers, ethylene-propylene-5-ethylidene-2-norbornene copolymers, ethylene-propylene-5-vinyl-2-norbornene copolymers, ethylene-butene-1,5-ethylidene-2-norbornene copolymers, ethylene-butene-1-dicyclopentadiene copolymers, ethylene-dicyclopentadiene copolymers and ethylene-butadiene copolymers.

In particular, the polyolefin resin (B) is preferably an ethylene-based copolymer, that is, a homopolymer of ethylene, or a (rubber-like) copolymer of ethylene and an α-olefin and/or a diene from the viewpoint of easily obtaining good compatibility with a modified polyethylene wax which is the modified olefin wax (A).

The limiting viscosity [η] of the polyolefin resin (B) as measured in decalin at 135° C. is in the range of for example 0.50 to 2.0 dl·g$^{-1}$, preferably 0.60 to 1.8 dl·g$^{-1}$, more preferably 0.70 to 1.5 dl·g$^{-1}$. When the limiting viscosity [η] of the polyolefin resin (B) is within the above range, the water-dispersible emulsion has a small average particle diameter, and therefore the coverage over the inorganic reinforcing material (D) is easily increased. Accordingly, the sizing force of the inorganic reinforcing material (D) increases, and therefore the inorganic reinforcing material (D) is harder to loosen during transportation, so that introduction into a molding machine is further facilitated.

The melting point of the polyolefin resin (B) as measured by a differential scanning calorimeter (DSC) is in the range of for example 60 to 160° C., preferably 70 to 150° C., more preferably 80 to 140° C., particularly preferably 90 to 130° C. When the melting point is within the above range, not only a water-dispersible emulsion is easily formed but also the fiber-sizing agent has good leveling properties, and therefore the coverage over the inorganic reinforcing material (D) is easily increased. Accordingly, slipping properties are further enhanced, so that breakage of the inorganic reinforcing material (D) is further suppressed. The heat resistance of the resin composition is easily enhanced.

Like the unmodified olefin wax (a), the polyolefin resin (B) may be modified by previously known various methods.

In this case, the polyolefin resin (B) and the modified olefin wax (A) can be distinguished according to, for example, the limiting viscosity [η]. The polyolefin resin (B) is preferably an unmodified polyolefin resin.

Like the modified olefin wax (A), the polyolefin resin (B) may be emulsified by previously known various methods. The polyolefin resin (B) alone can be emulsified, or the polyolefin resin (B) and the modified olefin wax (A) can be emulsified in parallel.

The mass ratio of the modified olefin wax (A) and the polyolefin resin (B) contained in the fiber-sizing agent, (A)/(B), is in the range of 0.2 to 10, preferably 0.3 to 8, more preferably 0.4 to 6, particularly preferably 0.5 to 5. When the mass ratio of the modified olefin wax (A) and the polyolefin resin (B), (A)/(B), is within the above range, the slipping properties of the inorganic reinforcing material (D) coated with the fiber-sizing agent are easily increased, so that breakage of the inorganic reinforcing material (D) during molding is suppressed. The dispersibility of the inorganic reinforcing material (D) in the resin composition is enhanced, so that the impact resistance and surface gloss properties of a molded article are improved. Specifically, when (A)/(B) is equal to or higher than the lower limit, the content ratio of the modified olefin wax (A) is relatively high, and therefore impact resistance is easily enhanced. When the mass ratio (A)/(B) is equal to or lower than the upper limit, the content ratio of the polyolefin resin (B) is relatively high, and therefore the modified olefin wax (A) is unlikely to bleed out to the surface of the molded article during molding the composition, so that surface gloss properties are easily improved. Sizing by the polyolefin resin (B) becomes sufficient, so that favorable handling properties are obtained.

1-3. Silane Coupling Agent (C)

The silane coupling agent (C) has one or more functional groups selected from an functional amino group, an epoxy group, an ester group, a vinyl group, an alkyl group, a methacryloxy group, an ureido group, an isocyanato group and a siloxane group. Preferred silane coupling agents (C) include silanes which have one or more functional groups selected from an amine group (primary, secondary, tertiary or quaternary), an amino group, an imino group, an amido group, an imido group, an ureido group, an isocyanato group and an azamido group and which contains one or more nitrogen atoms.

The silane coupling agent (C) may be a commercialized product. Examples of the silane coupling agent (C) include those commercially available from OSi Specialities ("OSi"), Middlebury, Conn. or Dow Corning Inc. ("DOW"), Midland, Mich. Examples of the silane coupling agent (C) include, but are not limited to, aminopropyltriethoxysilane, commercially available as A-1110 (trade name) from OSi; diamino-silane, commercially available as A-1120 (trade name) from OSi; and polyazamidesilanized aminosilane commercially available as A1387 (trade name) from OSi. Other effective commercialized aminosilanes include, but are not limited to, A-1100 (γ-(amino)propyltriethoxysilane (OSi); PC-1130 (aminopropylmethyldimethoxysilane) (Power Chemical products ("PCC"), Nanjing, China); PC1200 (aminoethyl aminopropyltrimethoxysilane) (PCC); PC1210 (aminoethylaminopropyltriethoxysilane) (PCC); PC1220 (aminoethylaminopropylmethyldimethoxy-silane) (PCC); PC1300 (diethylenetriaminopropyltrimethoxysilane) (PCC); and PC1600 (cyclohexylarninopropyltrimethoxysilane) (PCC).

Examples of other suitable coupling agents include organic functional silanes, for example those commercially available from OSi, such as A-154 (methyltrichlorosilane); A-163 (methyltrimethoxysilane); A-189 (γ-mercaptopropyltrimethoxysilane); A-143 (γ-chloropropyltrimethoxysilane); A-151 (vinyltriethoxysilane); A-172 (vinyltris-(2-methoxyethoxy)silane); A-188 (vinyltriacetoxysilane); A-174 (γ-(methacryloxy)propyltriethoxysilane); A-187 (γ-glycidoxypropyltrimethoxysilane); and A-1120 (n-(trimethoxysilylpropylethylenediamine)).

Other suitable coupling agents commercially available from OSi and so on include A-1102 (γ-aminopropyltriethoxysilane) (OSi); A-1106 (amino alkyl silicone solution) (OSi); A-1108 (modified aminoorganosilane) (OSi); A-1110 (γ-aminopropyltrimethoxysilane) (OSi); A-1120 (n-β-(aminoethyl)-β-aminopropyltrimethoxysilane) (OSi); A-1122 (oligomer β-(aminoethyl)-β-aminopropyltrisilanol) (OSi); A-1126 (modified aminoorganosilane (40%/methanol)) (OSi); A-1128 (modified amino silane (50%/methanol) (OSi); A-1130 (triamino functional silane) (OSi); A-1170 (bis(γ-trimethoxysilylpropyl)amine) (OSi); A-1387 (polyazamidesilane (50%/methanol)) (OSi); A-1524 (ureidesilane) (OSi); A-2120 (n-β-(aminoethyl)-β-aminopropylmethyldimethoxysilane) (OSi); A-Link (registered trademark)15(n-ethylaminoisobutyltrimethoxysilane) (OSi); DC1-6137 (n-β-(aminoethyl)-γ-aminopropyltrimethoxysilane aqueous solution) (DOW); DYNASYLAN 1172 (50% n-vinylbenzyl-n-aminoethyl-3-aminopropylpolysiloxane, hydroacetate) (HULS); HS2776 (alkylpolysiloxane (amino-modified (HULS))); VS142 (γ-aminopropyltriethoxysilane (aqueous)) (OSi); methacrylamide functional silane; n-phenyl-β-aminopropyltrimethoxysilane; Z6020 (n-β-(aminoethyl)-β-aminopropyltrimethoxysilane) (DOW); and Z6026 (modified aminoorganosilane (40%/methanol)) (DOW).

The content of the silane coupling agent (C) in the fiber-sizing agent is preferably 0.01 to 10 parts by mass, more preferably 0.05 to 5 parts by mass, further preferably 0.75 to 5 parts by mass, based on 100 parts by mass of the total of the modified olefin wax (A) and the polyolefin resin (B). When the content of the silane coupling agent (C) is above a certain level, the leveling properties of the fiber-sizing agent are easily enhanced, so that it is easy to uniformly cover the surface of an inorganic reinforcing material (D'). Accordingly, the slipping properties of the inorganic reinforcing material (D) are further enhanced, so that breakage of the inorganic reinforcing material (D) during molding is further suppressed. The dispersibility of the inorganic reinforcing material (D) in the resin composition is further enhanced, so that impact resistance and surface gloss properties of the molded article of the resin composition are further improved.

1-4. Other Additives

The fiber-sizing agent of the present invention may further contain other additives. Other additives include additives known in the field of inorganic reinforcing materials, and examples thereof include nucleating agents, anti-blocking agents, pigments, dyes, lubricants, plasticizers, mold release agents, antioxidants, flame retardants, ultraviolet absorbers, antibacterial agents, surfactants, antistatic agents, weather stabilizers, heat stabilizers, slip inhibitors, foaming agents, crystallization aids, anti-fogging agents, anti-aging agents, hydrochloric acid absorbers, impact resistance improvers, crosslinking agents, co-crosslinking agents, crosslinking aids, pressure sensitive adhesives, softening agents and processing aids.

These additives may be used singly, or used in combination of two or more thereof. The content of these additives is not particularly limited as long as the purpose of the present invention is not hindered, and the content of each of the additives added is, depending on the use, preferably about 0.05 to 70 parts by mass based on 100 parts by mass of the fiber-sizing agent. The upper limit is preferably 30 parts by mass.

Examples of the preferred aspect of the fiber-sizing agent of the present invention include a fiber-sizing agent including a modified olefin wax (A), a polyolefin resin (B) and a silane coupling agent (C), in which the mass ratio of the modified olefin wax (A) and the polyolefin resin (B), (A)/(B), is in the range of 0.5 to 10; the modified olefin wax (A) is a modified product of an ethylene-based polymer (modified polyethylene wax) having an ethylene content of 90 to 100 mol %; the polyolefin resin (B) is an ethylene-based polymer having an ethylene content of 60 to 100 mol %; and the modified olefin wax (A) meets the following requirement (i)':

(i)' the number average molecular weight (Mn) in terms of polystyrene as measured by gel permeation chromatography (GPC) is in the range of 300 to 10,000, preferably 300 to 3,000.

1-5. Method for Producing Fiber-Sizing Agent

The fiber-sizing agent of the present invention can be obtained by mixing at least the aforementioned modified olefin wax (A), polyolefin resin (B) and silane coupling agent (C) using any method.

2. Inorganic Reinforcing Material (D)

The inorganic reinforcing material (D) of the present invention is at least one selected from a glass fiber strand, a carbon fiber strand and a filler. The inorganic reinforcing materials (D) can be used singly, or used in combination of two or more thereof.

The inorganic reinforcing material (D) can be obtained by applying the fiber-sizing agent of the present invention to the inorganic reinforcing material (D') which is not coated with the fiber-sizing agent (or by covering the inorganic reinforcing material (D') with the fiber-sizing agent), and further sizing the inorganic reinforcing material (D') if necessary. The inorganic reinforcing material (D) is preferably a fiber strand (glass fiber strand or carbon fiber strand) obtained by applying the fiber-sizing agent of the present invention to a plurality of fiber filaments (glass fiber filaments or carbon fiber filaments) as the inorganic reinforcing material (D') to size the fiber filaments.

2-1. Glass Fiber Strand (D1)

The glass fiber strand (D1) is one obtained by sizing a plurality of glass fiber filaments with the fiber-sizing agent of the present invention. The type of the glass fiber strand (D1) is not particularly limited, and roving glass, chopped strand glass, milled glass or the like can be used. The glass fiber strands may be used singly, or used in combination of two or more thereof.

The average fiver diameter (d) of glass fiber filaments forming the glass fiber strand (D1) is for example 1 to 25 µm, preferably 5 to 17 µm. The length (cut length) (L) of the glass fiber chopped strand is not particularly limited, and is preferably 0.3 to 10 mm, more preferably 2 to 7 mm, farther preferably 2 to 5 mm from the viewpoint of workability. It is to be noted that the glass fiber chopped strand may break in extrusion molding at the time of preparing the resin composition.

The aspect ratio (average fiber length/average fiber diameter=L/d) of glass fiber filaments forming the glass fiber chopped strand is in the range of for example 1 to 100, preferably 5 to 70, more preferably 50 or less, and glass fiber filaments having different aspect ratios may be mixed at an appropriate ratio. When the aspect ratio is within the above range, it is possible to obtain a resin composition excellent in balance between surface gloss properties and mechanical properties. The cross-section shape of the glass fiber filament is not particularly limited, and may be any of a circular shape, an eyebrow-like shape, a gourd-like shape and an elliptic shape. The length of the glass fiber chopped strand and the average fiber diameter of filaments forming the strand can be examined by dissolving a molded article, filtering the resulting solution, and observing only the glass fiber chopped strand or filaments.

The glass fiber filaments may be subjected to surface treatment with a silane coupling agent (C), titanate coupling agent, an aluminate coupling agent or the like.

2-2. Carbon Fiber Strand (D2)

The carbon fiber strand (D2) is one obtained by sizing a plurality of carbon fiber filaments with the fiber-sizing agent of the present invention. The shape and the type of the carbon fiber strand (D2) are not particularly limited, the shape is a chopped strand shape, a robing strand shape, a milled fiber shape or the like, and the type may be either a pitch type or a polyacrylonitrile type.

The average fiber diameter of carbon fiber filaments forming the carbon fiber strand (D2) is preferably 0.5 to 15 µm, more preferably 1 to 10 µm. The average fiber diameter of the carbon fiber filaments is often 6 to 18 µm in general. The length (cut length) (L) of the carbon fiber chopped strand is preferably 1 to 15 mm, more preferably 2 to 10 mm, further preferably 3 to 8 mm. The chopped strand may be crushed during molding.

The aspect ratio (average fiber length/average fiber diameter=L/D) of carbon fiber filaments forming the carbon fiber chopped strand is in the range of preferably 15 to 100, more preferably 20 to 50.

The carbon fiber strand (D2) may be one obtained by spinning or molding a raw material composition, and then performing carbonization. The carbon fiber strand (D2) may be one in which carbon fiber filaments obtained by a vapor deposition method basically without passing a spinning step are treated with a fiber-sizing agent.

The carbon fiber filaments obtained by a vapor deposition method have a small fiber diameter and a high aspect ratio (L/D). Thus, a carbon fiber strand containing carbon fiber filaments obtained by a vapor deposition method can impart high stiffness and a good surface appearance to a molded article of a resin composition. The carbon fiber filament may be one with a specific surface area increased by performing activation treatment.

The carbon fiber filament may be subjected to surface treatment with a silane coupling agent (C), a titanate coupling agent, an aluminate coupling agent or the like.

2-3. Filler (D3)

The filler (D3) is one obtained by treating a filler as a raw material with the fiber-sizing agent of the present invention. Examples of the filler to be used as a raw material include amorphous fillers such as calcium carbonate, silica, kaolin, clay, titanium oxide, barium sulfate, zinc oxide, aluminum hydroxide, alumina and magnesium hydroxide, plate-like fillers such as talc, mica and glass flakes, acicular fillers such as wollastonite, potassium titanate, basic magnesium sulfate, sepiolite, xonotlite and aluminum borate, and fillers such as metal powder, metal flakes, or carbon black and carbon fine particles. Examples of other fillers to be used include glass beads and glass powder. These fillers may be used singly, or used in combination of two or more thereof. Fillers in which the surface thereof is covered with carbon or silane coupling treatment or the like may be used singly, or used in combination of two or more thereof.

The amount of the fiber-sizing agent attached is preferably 0.01 to 10 mass %, more preferably 0.05 to 5 mass %, based on the amount of the inorganic reinforcing material (D'). When the amount of the fiber-sizing agent attached is above a certain level, fiber filaments are easily sized, and when the amount of the fiber-sizing agent attached is below a certain level, the effect of enhancing the mechanical properties of a molded article is unlikely to be impaired. The amount of the fiber-sizing agent attached can be determined from a difference in weight between the inorganic reinforcing material (D) and the inorganic reinforcing material (D').

2-4. Method for Producing Inorganic Reinforcing Material (D)

The inorganic reinforcing material (D) can be obtained by coating the inorganic reinforcing material (D') with the fiber-sizing agent, and then sizing the inorganic reinforcing material (D') if necessary as described above. The inorganic reinforcing material (D') can be coated with the fiber-sizing agent by a known method. For example, the glass fiber strand (D1) is produced in the following manner: melt glass is supplied to a bushing provided on the lower part of a spinning furnace, the melt glass flowing out from a large number of orifices on the bottom part of the bushing is extended by a tensile force from a winding collet to form a large number of glass fiber filaments, and the large number of glass fiber filaments are coated with the fiber-sizing agent by a sizing agent application apparatus, and then bundled by one or more bundling rollers to form a bundle of glass fiber filaments (hereinafter, referred to as a glass fiber strand (D1)). The glass fiber strand (D1) is normally wound around a winding collet, and dried to evaporate moisture in the fiber-sizing agent. The glass fiber strand (D1) produced in this way is processed into the form of glass robing, a glass robing cloth, a glass chopped strand, a glass chopped strand mat, glass milled fibers, a glass yarn, a glass yarn cloth or the like depending on an intended use.

As methods for applying the fiber-sizing agent, methods using a coater-type sizing agent application apparatus and methods using a spray-type sizing agent application apparatus are known. The coater-type sizing agent application apparatus is an apparatus in which the bottom part of a revolving sizing agent application surface portion such as a surface of a rotary roller is immersed in a fiber-sizing agent liquid tank to attach a fiber-sizing agent to the surface of the bottom part, and glass filaments drawn out from nozzles are brought into contact with the sizing agent application surface to apply the sizing agent to the glass filaments. As coater-type sizing agent application apparatuses, roller-type sizing agent application apparatuses and belt-type sizing agent application apparatuses are known. The roller-type sizing agent application apparatus is one in which a surface of a rotary roller is used as a sizing agent application surface portion, and the belt-type sizing agent application apparatus is one in which a surface of a rotary belt driven by two rolls that are a rotary roller and an oil feed roller is used as a sizing agent application surface portion. On the other hand, the spray-type sizing agent application apparatus is one in which the fiber-sizing agent is sprayed by a spray gun to attach the fiber-sizing agent to glass fiber filaments. Patent Literature 1 shows an example of the spray-type sizing agent application apparatus. In this apparatus, a sprayed sizing agent is received by a funnel, so that the sizing agent is reused.

Patent Literature 2 or 3 discloses a method for applying a fiber-sizing agent in which a coater-type sizing agent application apparatus and a spray-type sizing agent application apparatus are used in combination. In this method, glass filaments are coated with a sizing agent by a spray-type sizing agent application apparatus before being bundled, and a fiber-sizing agent application surface portion such as a rotary roller or a rotary belt is brought into contact with a glass fiber strand after the glass filaments are bundled. Patent Literature 4 discloses a method in which glass fiber filaments are coated with a fiber-sizing agent by a roller-type sizing agent application apparatus before being bundled, and the glass fiber filaments are bundled, followed by coating the strand by the roller-type sizing agent application apparatus.

3. Resin Composition

The resin composition of the present invention contains the aforementioned inorganic reinforcing material (D) and a resin (E).

3-1. Resin (E)

The resin (E) contained in the resin composition of the present invention is at least one selected from the group consisting of a thermoplastic resin and a thermosetting resin. The resin (E) is a resin different from the polyolefin resin (B). Examples of the resin (E) include thermoplastic resins selected from the group consisting of a polycarbonate resin, thermoplastic polyester resin, a polyacetal resin, a polyamide resin, a polyphenylene oxide resin and a polyimide resin; and thermosetting resins selected from the group consisting of an epoxy resin, a thermosetting unsaturated polyester resin and a phenol resin. The resin (E) may be composed of one of these thermoplastic resins and thermosetting resins, or may be a combination of two or more thereof.

The definition of the thermoplastic resin or the thermosetting resin and the method for producing the resin are well known, and described in publications such as "Practical Encyclopedia of Plastics" (edited by Practical Encyclopedia of Plastics Editorial Board, published by Sangyo Chosakai Co., Ltd.).

The following resins (1) to (6) are examples of resins, each of which may be the resin (E).

(1) Polycarbonate Resin

The polycarbonate resin is typically an aromatic polycarbonate resin obtained by reacting an aromatic diol (for example bisphenol A) with phosgene, and in the present invention, polydiethylene glycol bisphenyl carbonate is preferable. Such polycarbonate resins are commercially available, and examples thereof include resins whose trade names are NOVAREX (Mitsubishi Chemical Corporation), PANLITE (Teijin Limited) and LEXAN (SABIC Innovative Plastics). These polycarbonate resins can be preferably used in the present invention.

(2) Thermoplastic Polyester Resin

The thermoplastic polyester resin is typically a resin obtained by subjecting a dicarboxylic acid and a diol to polycondensation. As the thermoplastic polyester resin, polyethylene terephthalate, polybutylene terephthalate, polyethylene-2,6-naphthalene dicarboxylate, polycyclohexane terephthalate and the like are preferably used in the present invention. Such thermoplastic polyester resins are commercially available, and for example, a resin whose trade name is RYNITE (DuPont Japan Limited), and the like can be preferably used in the present invention.

(3) Polyacetal Resin

The polyacetal resin is typically a resin obtained by subjecting formalin or trioxane, together with ethylene oxide as desired, to ring-opening polymerization in the presence of a cationic catalyst. The resin has a polyoxymethylene chain as a main backbone. In the present invention, polyacetal resins of copolymer type are preferably used. Such polyacetal resins are commercially available, and for example, a resin whose trade name is IUPITAL (Mitsubishi Engineering-Plastics Corporation), and the like can be preferably used in the present invention.

(4) Polyamide Resin

The polyamide resin is typically a resin obtained by polycondensation of a diamine and a dicarboxylic acid, ring-opening polymerization of caprolactam, or the like. In the present invention, polycondensation reaction products of an aliphatic diamine with an aliphatic or aromatic dicarboxylic acid are preferable. Such polyamide resins are commercially available, and for example, resins whose trade names are LEONA (Asahi Kasei Chemicals Corporation) and ZYTEL (DuPont Japan Limited), and the like can be preferably used in the present invention.

(5) Polyphenylene Oxide Resin

The polyphenylene oxide resin is typically a resin obtained by subjecting 2,6-dimethylphenol to oxidative coupling in the presence of a copper catalyst, and it is also possible to use modified polyphenylene oxide resins obtained by performing modification using a method in which other resins are blended with the above-mentioned resin, or the like, in the present invention. In the present invention, modified products obtained by blending a styrene-based polymer are preferable. Such polyphenylene oxide resins are commercially available, and for example, resins whose trade names are ZYLON (Asahi Kasei Chemicals Corporation) and IUPIACE (Mitsubishi Engineering-Plastics Corporation), and the like can be preferably used in the present invention.

(6) Polyimide Resin

The polyimide resin is typically a resin obtained by subjecting a tetracarboxylic acid and a diamine to polycondensation to form an imide bond on a main backbone. In the present invention, resins formed from pyromellitic anhydride and diaminodiphenyl ether are preferable. Such polyimide resins are commercially available, and for example, a resin whose trade name is VESPEL (DuPont Japan Limited), and the like can be preferably used in the present invention.

The following resins (7) to (9) are examples of thermosetting resins, each of which may be the resin (E). Thermosetting resins described below are those before thermal hardening.

(7) Epoxy Resin

The epoxy resin is typically a resin obtained by reacting an aromatic diol (for example bisphenol A) with epichlorohydrin in the presence of an alkali. In the present invention, bisphenol A-type epoxy resins, bisphenol F-type epoxy resins and bisphenol S-type epoxy resins each having an epoxy equivalent of 170 to 5,000 are preferable. Such epoxy resins are commercially available, and for example, resins whose trade names are EPOMIK (Mitsui Chemicals, Incorporated), EPICLON (Dainippon Ink and Chemicals, Incorporated) and SUMI-EPOXY (Sumitomo Chemical Company, Limited), and the like can be preferably used in the present invention.

(8) Thermosetting Unsaturated Polyester Resin

The thermosetting unsaturated polyester resin is typically a resin obtained by subjecting an aliphatic unsaturated dicarboxylic acid and an aliphatic diol to esterification reaction. In the present invention, resins obtained by subjecting an unsaturated dicarboxylic acid such as maleic acid or fumaric acid and a diol such as ethylene glycol or diethylene glycol to esterification reaction are preferable. Such thermosetting unsaturated polyester resins are commercially available, and for example, resins whose trade names are RIGOLAC (Showa Highpolymer Co., Ltd.) and SUMIKON (Sumitomo Bakelite Co., Ltd.), and the like can be preferably used in the present invention.

(9) Phenol Resin

The phenol resins include all of so-called novolac-type and resol-type phenol resins, and in the present invention, the phenol resin is preferably a novolac-type phenol resin which is hardened by hexamethylenetetramine, or a solid resol mainly consisting of a dimethylene ether bond. Such phenol resins are commercially available, and for example, resins whose trade names are SUMIKON PM (Sumitomo Bakelite Co., Ltd.) and NIKKALINE (The Nippon Synthetic Chemical Industry Co., Ltd.), and the like can be preferably used in the present invention.

Here, the resin (E) is preferably a thermoplastic resin having a melting point (Tm) of 200° C. or higher. The melting point (Tm) of the resin (E) is preferably 205° C. or higher, more preferably 210° C. or higher. The melting point (Tm) of the resin (E) is preferably 500° C. or lower, further preferably 400° C. or lower, particularly preferably 350° C. or lower. The melting point (Tm) of the resin (E) is measured using a differential scanning calorimeter (DSC). Specifically, an aluminum pan is filled with about 10 mg of a sample, the sample is once melted by heating, and then cooled to 30° C. at a rate of 10° C./min, and the endothermic peak in heating the sample at a rate of 10° C./min is defined as a melting point. When the resin (E) is a high-heat-resistance resin which is thermally decomposed before observation of the melting point (Tm), the temperature at the time of the occurrence of thermal decomposition is defined as the melting point (Tm).

The resin (E) having a melting point (Tm) of 200° C. or higher may be a thermoplastic resin containing elements of Groups 15 to 17, a carbon element and a hydrogen element. Examples of the elements of Groups 15 to 17 include oxygen and nitrogen. More specific examples of the thermoplastic resin containing elements of Groups 15 to 17, a carbon element and a hydrogen element include polycarbonate resins, thermoplastic polyester resins and polyamide resins. Specific examples of the commercialized products of the resin include AMILAN CM1041LO (Toray Industries, Inc.: polyamide resin, melting point: 225° C.) and NOVA-DURAN 5020 (Mitsubishi Engineering-Plastics Corporation: polybutylene terephthalate resin, melting point: 224° C.).

Preferably, the resins (E) include polycarbonate resins, polyamide resins or thermoplastic polyester resins. The reason why the resin (E) is preferably a polycarbonate resin, a polyamide resin or a thermoplastic polyester resin may be as follows. In general, the carbonyl group or the aromatic backbone of the resin (E) has poor compatibility with the modified olefin wax (A), so that interfacial delamination may occur between the resin (E) and the modified olefin wax (A) when impact is applied to a molded article of the resin composition. That is, when impact is applied to the molded article of the resin composition of the present invention, minute interfacial delamination occurs between the modified olefin wax (A) present in the vicinity of the surface of the inorganic reinforcing material (D) and the resin (E), resulting in enhancement of the impact strength of the molded article. That is, it is considered that the modified olefin wax (A) effectively acts as an impact modification material, so that the impact resistance of the molded article is enhanced.

Therefore, the reason why the molded article of the resin composition of the present invention has high impact resistance and surface gloss properties is not necessarily evident, and can be considered to be as follows. 1) The modified olefin wax (A) can be easily made present in the vicinity of the surface of the inorganic reinforcing material (D) in the resin composition by adding the modified olefin wax (A) to the fiber-sizing agent of the inorganic reinforcing material (D) rather than adding the modified olefin wax (A) directly to the resin composition. Accordingly, it is considered that the slipping properties and dispersibility of the inorganic reinforcing material (D) during molding may be easily enhanced, and as described above, impact strength may be enhanced due to the occurrence of minute interfacial delamination in application of impact to the molded article. 2) By incorporating not only the modified olefin wax (A) but also the polyolefin resin (B) in the fiber-sizing agent, and setting the mass ratio (A)/(B) within a predetermined range, the modified olefin wax (A) can be inhibited from bleeding out to the surface of the resin composition during molding, the slipping properties and dispersibility of the inorganic reinforcing material (D) during molding can be further enhanced, and impact strength can be further enhanced.

Thus, it is considered that due to enhancement of the slipping properties of the inorganic reinforcing material (D), collapse of the inorganic reinforcing material (D) during molding is easily suppressed, and dispersibility is enhanced, so that the surface gloss properties of the molded article can be improved. Further, the modified olefin wax (A) is unlikely to bleed out to the surface of the resin composition, and this may also be a factor of improving the surface gloss properties of the molded article. Further, it is considered that since the dispersibility of the inorganic reinforcing material (D) is enhanced, the dispersibility of the modified olefin wax (A) present in the vicinity of the inorganic reinforcing material (D) is easily enhanced, so that the impact resistance of the molded article of the resin composition of the present invention is further enhanced.

Depending on required mechanical strength or the like, the content of the inorganic reinforcing material (D) in the resin composition of the present invention is preferably 5 to 100 parts by mass, more preferably 10 to 70 parts by mass, based on 100 parts by mass of the resin (E). When the content of the inorganic reinforcing material (D) is above a certain level, sufficient mechanical strength is easily imparted to the molded article of the resin composition, and when the content of the inorganic reinforcing material (D) is below a certain level, moldability and impact resistance are unlikely to be impaired.

3-2. Other Ingredients

For the resin composition of the present invention, known additives can be used. Examples thereof include nucleating agents, anti-blocking agents, pigments, fibers, bulking agents, fillers, dyes, lubricants, plasticizers, mold release agents, antioxidants, flame retardants, ultraviolet absorbers, antibacterial agents, surfactants, antistatic agents, weather stabilizers, heat stabilizers, slip inhibitors, foaming agents, crystallization aids, anti-fogging agents, anti-aging agents, hydrochloric acid absorbers, impact resistance improvers, crosslinking agents, co-crosslinking agents, crosslinking aids, pressure sensitive adhesives, softening agents and processing aids. These additives may be used singly, or used in combination of two or more thereof.

Examples of the pigments include inorganic pigments (titanium oxide, iron oxide, chromium oxide, cadmium sulfide and the like), and organic pigments (azo lake-based pigments, thioindigo-based pigments, phthalocyanine-based pigments and anthraquinone-based pigments). Examples of the dyes include azo-based dyes, anthraquinone-based dyes and triphenylmethane-based dyes. The content of these pigments and dyes is not particularly limited, and is normally 5 parts by mass or less, preferably 0.1 to 3 parts by mass in total based on 100 parts by mass of the resin composition.

Examples of the lubricants include waxes other than the modified olefin wax (A) (unmodified polyethylene wax, unmodified polypropylene wax, petrolatum, tall oil, castor oil, rape oil, soybean oil, coconut oil, bees wax, paraffin wax, liquid paraffin, carnauba wax, montanoic acid wax, microcrystalline wax and the like), higher fatty acids (stearic acid and the like) and metal salts thereof (zinc stearate, calcium stearate and the like), higher alcohols (stearyl alcohol and the like) and esters thereof (butyl stearate and the like), higher fatty acid amides (amide stearate and the like), process oils, and various lubricating agents. As the lubricating agent, for example, Mitsui HIGH-WAX (manufactured by Mitsui Chemicals, Incorporated) is used. The lubricants are used at a ratio of preferably 0.05 to 10 parts by mass based on 100 parts by mass of the resin composition.

Examples of the plasticizers include aromatic carboxylic acid esters (dibutyl phthalate and the like), aliphatic carboxylic acid esters (methyl acetylricinoleate and the like), aliphatic dicarboxylic acid esters (adipic acid-propylene glycol-based polyester and the like), aliphatic tricarboxylic acid esters (triethyl citrate and the like), phosphoric acid triesters (triphenyl phosphate and the like), epoxy fatty acid esters (epoxybutyl stearate and the like), and petroleum resins.

As the antioxidants, known antioxidants can be used. Specific examples thereof include phenol-based antioxidants (2,6-di-t-butyl-4-methylphenol and the like), polycyclic phenol-based antioxidants (2,2'-methylenebis(4-methyl-6-t-butylphenol) and the like), phosphorus-based antioxidants (tetrakis(2,4-di-t-butylphenyl)-4,4-biphenylene diphosphonate and the like), sulfur-based antioxidants (dilauryl thiodipropionates and the like), amine-based antioxidants (N,N-diisopropyl-p-phenylenediamine and the like), and lactone-based antioxidants.

Examples of the flame retardants include organic retardants (nitrogen-containing retardants, sulfur-containing retardants, silicon-containing retardants, phosphorus-containing retardants and the like), and inorganic retardants (antimony trioxide, magnesium hydroxide, zinc borate, red phosphorus and the like).

Examples of the ultraviolet absorbers include benzotriazole-based ultraviolet absorbers, benzophenone-based ultraviolet absorbers, salicylic acid-based ultraviolet absorbers and acrylate-based ultraviolet absorbers.

Examples of the antibacterial agents include quaternary ammonium salts, pyridine-based compounds, organic acids, organic acid esters, halogenated phenols and organic iodine.

Examples of the surfactants include nonionic surfactants, anionic surfactants, cationic surfactants and amphoteric surfactants. Examples of the nonionic surfactants include polyethylene glycol-type nonionic surfactants such as higher alcohol ethylene oxide adducts, fatty acid ethylene oxide adducts, higher alkyl amine ethylene oxide adducts and polypropylene glycol ethylene oxide adducts, and polyhydric alcohol-type nonionic surfactants such as polyethylene oxides, fatty acid esters of glycerin, fatty acid esters of pentaerythritol, fatty acid esters of sorbitol or sorbitan, alkyl ethers of polyhydric alcohols and fatty acid amides of alkanolamines. Examples of the anionic surfactants include sulfonic acid salts such as sulfuric acid ester salts such as alkali metal salts of higher fatty acids, alkylbenzene sulfonic acid salts, alkyl sulfonic acid salts and paraffin sulfonic acid salts, and phosphoric acid ester salts such as higher alcohol phosphoric acid ester salts. Examples of the cationic surfactants include quaternary ammonium salts such as alkyl trimethylammonium salts. Examples of the ampholytic surfactants include amino acid-type ampholytic surfactants such as higher alkyl aminopropionic acid salts, and betaine-type ampholytic surfactants such as higher alkyl dimethyl betaines and higher alkyl dihydroxyethyl betaines.

Examples of the antistatic agents include the above surfactants, fatty acid esters and polymeric antistatic agents. Examples of the polymeric antistatic agents include polyether ester amides.

Examples of the crosslinking agents include organic peroxides. Examples of the organic peroxides include dicumyl organic peroxide, di-tert-butyl organic peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl organic peroxide, p-chlorobenzoyl peroxide, 2,4-dichlorobenzoyl organic peroxide, tert-butyl peroxybenzoate, tert-butyl perbenzoate, tert-butyl peroxyisopropyl carbonate, diacetyl organic peroxide, lauroyl organic peroxide and tert-butyl cumyl organic peroxide.

Among them, 2,5-dimethyl-2,5-di-(tert-butylperoxy) hexane, 2,5-dimethyl-2,5-di-(tert-butylperoxy)hexyne-3,1, 3-bis(tert-butylperoxyisopropyl)benzene, 1,1-bis(tert-butylperoxy)-3,3,5-trimethylcyclohexane and n-butyl-4,4-bis(tert-butylperoxy)valerate are more suitably used, and 1,3-bis(tert-butylperoxyisopropyebenzene is further suitably used, from the viewpoint of odor properties and scorch stability.

The organic peroxide is used at a ratio of preferably 0.05 to 10 parts by mass based on 100 parts by mass of the resin (E).

In crosslinking treatment with an organic peroxide, a peroxy crosslinking aid such as sulfur, p-quinone dioxime, p,p'-dibenzoylquinone dioxime, N-methyl-N-4-dinitro so aniline, nitrosobenzene, diphenylguanidine or trimethylolpropane-N,N-m-phenylenedimaleimide, a polyfunctional methacrylate monomer such as divinylbenzene, triallyl cyanurate, ethylene glycol dimethacrylate, diethylene glycol dimethacrylate, polyethylene glycol dimethacrylate, trimethylolpropane trimethacrylate or allyl methacrylate, or a polyfunctional vinyl monomer such as vinyl butyrate or vinyl stearate can be added as a crosslinking aid.

When the above compounds are used, uniform and mild crosslinking reaction can be expected. Particularly, in the present invention, divinyl benzene is suitably used. Divinyl benzene is easy to handle, has good compatibility with a polymer and an ability to solubilize an organic peroxide, and serves as a dispersant for the organic peroxide. Thus, uniform crosslinking effect is exhibited, so that it is possible to obtain a dynamically heat-treated product in which fluidity is well balanced with physical properties.

The crosslinking aid is used at a ratio of preferably 0.05 to 10 parts by mass based on 100 parts by mass of the resin (E).

Examples of the softening agents include coal tar-based softening agents such as coal tar and coal tar pitch, synthetic high-molecular substances such as atactic polypropylene, ester-based plasticizers such as dioctyl phthalate, dioctyl adipate and dioctyl sebacate, and carbonic acid ester-based plasticizers such as diisododecyl carbonate.

The amount of the softening agent is not particularly limited, and is preferably 1 to 200 parts by mass based on 100 parts by mass of the resin (E). The softening agent facilitates processing and helps dispersion of carbon black or the like in preparation of the resin composition.

3-3. Method for Producing Resin Composition

The resin composition of the present invention can be produced by performing dry-blending or melt-blending using any of various methods. That is, the method for producing the resin composition of the present invention includes preparing the inorganic reinforcing material (D) by the method described in section 2-4. above, and melt-kneading the inorganic reinforcing material (D) and the resin (E). As a specific method, for example, a method is appropriately used in which the glass fiber strand (D1), the resin (E) and other arbitrary ingredients are blended simultaneously or sequentially in any order using a tumbler, a V-shaped blender, a Nauta mixer, a Banbury mixer, a kneading roll, a single-screw or twin-screw extruder or the like. Alternatively, blending may be performed in the following manner—the glass fiber strand (D1), the resin (E) and other optional ingredients are once dispersed or dissolved in any solvent, and the resulting dispersion or solution is dried by an appropriate method such as natural drying or forced drying by heating.

4. Molded Article and Its Intended Use

The resin composition of the present invention can be molded to be used as a molded article. The molding method is not particularly limited, and examples thereof include injection molding, extrusion molding and compression molding, with injection molding being preferable from the viewpoint of design and moldability.

The resin composition of the present invention can be molded into molded articles in a wide range of uses from household products to industrial products. Examples of the molded articles include electric components, electronic components, automobile components, machine mechanical components, food containers, films, sheets and fibers. More specific examples include office automation equipment such as printers, personal computers, word processors, keyboards, PDAs (Personal Digital Assistants), telephone sets, mobile phones, smartphones, tablet terminators, Wi-Fi routers, facsimile machines, copiers, ECRs (electronic cash registers), electronic calculators, electronic notebooks, electronic dictionaries, cards, holders and stationeries; household equipment such as washers, refrigerators, cleaners, microwave ovens, lighting fixtures, game machines, clothes irons and tables with heater; AV equipment such as TVs, VTRs, video cameras, digital cameras, single-lens reflex cameras, portable audio terminals, radio-cassette players, tape recorders, mini discs, CD players, speakers and liquid crystal displays; and electric and electronic components and communication equipment such as connectors, relays, capacitors, switches, printed boards, coil bobbins, semiconductor sealing materials, electric wires, cables, transformers, deflection yokes, distribution boards and timepieces.

Further, examples of the molded articles include materials for automobiles, vehicles, vessels, aircrafts and buildings such as seats (waddings, outer materials and the like), belts, ceiling claddings, compatible tops, armrests, door trims, rear package trays, carpets, mats, sun visors, wheel covers, tires, mattress covers, air bags, insulation materials, hangers, hanging straps, electric wire covering materials, electric insulation materials, paints, coating materials, lining materials, floor materials, corner materials, deck panels, covers, plywood, ceiling boards, division plates, side walls, carpets, wallpapers, wall covering materials, exterior materials, interior materials, roof materials, acoustic insulation boards, heat insulation boards and window materials; and daily commodities and sports goods such as clothes, curtains, bed sheets, plywood, synthetic fiber boards, carpets, doormats, sheets, buckets, hoses, containers, glasses, bags, cases, goggles, ski plates, rackets, tents and musical instruments.

Further, examples of the molded articles include bottles for shampoos, detergents and the like, bottles for seasonings such as edible oils and soy sauces, bottles for beverages such as mineral water and juice, heat-resistant food containers such as lunchboxes and steamed egg hotchpotch bowls, eating utensils such as dishes and chopsticks, various other food containers, packaging films and packaging bags.

EXAMPLES

The present invention will be described in detail by way of Examples, which should not be construed as limiting the present invention.

1. Modified Olefin Wax (A)

Olefin waxes (W1) to (W3) shown in Table 2 were used as modified olefin waxes (A). Methods for producing olefin waxes will be described later in the sections of Examples and Comparative Examples. Unmodified olefin waxes (a) used for production of the modified olefin wax (A) and unmodified olefin waxes (a) used in Comparative Examples are shown in Table 1.

were measured by gel permeation chromatography (GPC) under the following conditions. The number average molecular weight Mn and the weight average molecular weight Mw were determined with a calibration curve prepared using commercialized monodisperse standard polystyrene.

Apparatus: Gel permeation chromatograph Alliance GPC2000 Model (Waters Corporation)
Solvent: o-dichlorobenzene
Column: TSKgel GMH6-HTX2, TSKgel GMH6-HTL column×2 (each manufactured by TOSOH CORPORATION)
Flow rate: 1.0 ml/min
Sample: 0.15 mg/mL o-dichlorobenzene solution
Temperature: 140° C.

<Softening Point>

The softening point was measured according to JIS K2207.

<Density>

The density was measured according to JIS K7112.

<Acid Value>

The acid value was measured according to JIS K5902. Here, an acid value of 11 mgKOH/g is equivalent to a polar group content of 1 mass % (the polar group is a carboxyl group and/or a carboxyl derivative group in the acid-modi-

TABLE 1

|  |  | Unit | Unmodified olefin wax (a) | | | | |
|---|---|---|---|---|---|---|---|
|  |  |  | a1 | a2 | a3 | a4 | a5 |
| Production method | Polymerization | — | Ziegler | Ziegler | Ziegler | Ziegler | Ziegler |
| Composition | C2 | mol % | 96 | 97 | 97 | 96 | 97 |
|  | C3 | mol % | 4 | 3 | 3 | 4 | 3 |
| Physical properties | Mn | PS conversion | 1300 | 2800 | 2000 | 1300 | 4000 |
|  | Softening point | ° C. | 115 | 110 | 120 | 110 | 118 |
|  | Density | kg/m³ | 910 | 920 | 940 | 920 | 930 |

TABLE 2

|  |  | Unit | Modified olefin wax (A) | | |
|---|---|---|---|---|---|
|  |  |  | W1 | W2 | W3 |
| Production method | Polymerization | — | Ziegler | Ziegler | Ziegler |
|  | Modification | — | Acid-modified | Acid-modified | Oxidized |
| Composition | C2 | mol % | 96 | 97 | 97 |
|  | C3 | mol % | 4 | 3 | 3 |
| Physical properties | Mn | PS conversion | 1700 | 3000 | 2500 |
|  | Softening point | ° C. | 110 | 106 | 110 |
|  | Density | kg/m³ | 920 | 930 | 950 |
|  | Acid value | mg/g | 60 | 30 | 17 |

A method for analyzing the modified olefin wax (A) and the unmodified olefin wax (a) will be described below.

<Composition>

The content ratios of ethylene-derived constituent units and α-olefin-derived constituent units having 3 or more carbon atoms in the modified olefin wax (A) and the unmodified olefin wax (a) were determined by analysis of $^{13}C$-NMR spectra. In Tables 1 and 2, C2 denotes ethylene, and C3 denotes propylene.

<Mn and Mw/Mn>

The number average molecular weight Mn and the molecular weight distribution (Mw/Mn) of each of the modified olefin wax (A) and the unmodified olefin wax (a)

fied olefin wax (A1), and a carboxyl group, a carbonyl group and/or a hydroxyl group in the oxidized olefin wax (A2).

2. Polyolefin Resin (B)

[Production Example 1] Production of Polyolefin Resin Emulsion (B1)

1,150 mL of water and 106 g of polyoxyethylene lauryl ether were put in a pressure-resistant homomixer having an internal volume of 4 L, and heated to 180° C., and 450 g of UBE polyethylene J6016 (LDPE, [η]=0.71 dl/g, melting point=105° C.) in a molten state was supplied by a gear pump over 1 hour while the mixture was stirred at 5,000 rpm. The mixture was further stirred for 1 hour, and then cooled to room temperature to obtain a water-dispersible emulsion (solid concentration=30%). The polyolefin resin emulsion (B1) in the water dispersion liquid included spherical particles, the average particle diameter among 100 particles was 10 μm, and little phase separation occurred after the dispersion liquid was left standing for 7 days.

The average particle diameter of the polyolefin resin (B) was measured by a Coulter counter (Coulter Counter Multisizer II manufactured by Beckman Instruments, Inc.).

3. Production of Fiber-Sizing Agent and Inorganic Reinforcing Material (D)

Examples of the fiber-sizing agent and the inorganic reinforcing material (D) will be described below.

[Example 1-1] Production of Glass Fiber Chopped Strand (GF1)

<Production of Modified Olefin Wax Water-Dispersible Emulsion (EM1a)>
(1) Preparation of Catalyst
In a glass autoclave having an internal volume of 1.5 liters, 25 g of commercialized anhydrous magnesium chloride was suspended with 500 ml of hexane. The suspension was maintained at 30° C., 92 ml of ethanol was added dropwise over 1 hour while the mixture was stirred, and the mixture was further reacted for 1 hour. After completion of the reaction, 93 ml of diethylaluminum monochloride was added dropwise over 1 hour, and the mixture was further reacted for 1 hour. After completion of the reaction, 90 ml of titanium tetrachloride was added dropwise, and the reaction vessel was heated to 80° C. to react the mixture for 1 hour. After completion of the reaction, the solid part was washed with hexane by decantation until free titanium was no longer detected. This was taken as a hexane suspension liquid, and the titanium concentration was determined by titration. The hexane suspension liquid was used for the following experiments.

(2) Production of Unmodified Olefin Wax (a1)
930 ml of hexane and 70 ml of propylene were put in a stainless autoclave sufficiently purged with nitrogen and having an internal volume of 2 liters, and hydrogen was introduced to 20.0 kg/cm² (gauge pressure). Subsequently, the temperature of the inside of the system was elevated to 170° C., and 0.1 millimoles of triethylaluminum, 0.4 millimoles of ethylaluminum sesquichloride and the obtained hexane suspension liquid of solid were then injected with ethylene in such a manner that the amount of titan components was 0.008 millimoles in terms of atoms, whereby polymerization was started.

Thereafter, only ethylene was continuously supplied to maintain the total pressure at 40 kg/cm² (gauge pressure), and polymerization was performed at 170° C. for 40 minutes.

Polymerization was stopped by adding a small amount of ethanol to the inside of the system, and unreacted ethylene and propylene were then purged. The obtained polymer solution was dried overnight under reduced pressure at 100° C. to obtain an unmodified olefin wax (a1).

(3) Production of Modified Olefin Wax (W1)
500 g of the unmodified olefin wax (a1) was put in a glass reaction vessel, and melted in a nitrogen atmosphere at 160° C. Subsequently, 30 g of maleic anhydride and 3 g of di-t-butyl peroxide (hereinafter, abbreviated as DTBPO) were continuously supplied into the above reaction system (temperature: 160° C.) over 5 hours. Thereafter, the mixture was further heated and reacted for 1 hour, then degassed in a molten state in vacuum at 10 mmHg for 0.5 hours to remove volatile components, and then cooled to obtain a modified olefin wax (W1) as an acid-modified olefin wax. Table 2 shows the physical properties thereof.

(4) Production of Modified Olefin Wax Water-Dispersible Emulsion (EM1a)
1,150 mL of water and 10.6 g of sodium hydroxide (0.55 equivalent with respect to maleic anhydride of the modified olefin wax (W1)) were put in a pressure-resistant homomixer having an internal volume of 4 L, and heated to 180° C., and 450 g of the modified olefin wax (W1) in a molten state was supplied by a gear pump over 1 hour while the mixture was stirred at 5,000 rpm. The mixture was further stirred for 1 hour, and then cooled to room temperature to obtain a water-dispersible emulsion (EM1a solid concentration=30 mass %). The modified olefin wax (W1) in the water dispersion liquid included spherical particles, the average particle diameter among 100 particles was 5 μm, and little phase separation occurred after the dispersion liquid was left standing for 7 days. The average particle diameter of the modified olefin wax (W1) was measured by the same method as described above.

<Production of Fiber-Sizing Agent>
The produced modified olefin wax water-dispersible emulsion (EM1a) as the modified olefin wax (A), the polyolefin resin emulsion (B1) as the polyolefin resin (B), and a silane coupling agent (Z-6011, 3-aminopropyltriethoxysilane, manufactured by Dow Corning Toray Co., Ltd.) as the silane coupling agent (C) were blended at a solid content ratio of 2/8/0.1 (mass ratio) to prepare a fiber-sizing agent.

<Production of Glass Fiber Chopped Strand (GF1)>
As the inorganic reinforcing material (D'), glass fiber filaments each having a diameter of 13 μm were coated with the prepared fiber-sizing agent by an applicator in such a manner that the amount of effective ingredients attached was 2.0 mass % based on the amount of the glass fiber filaments. 200 glass fiber filaments were bundled by a bundling guide to prepare a strand. Thereafter, the strand was cut to a length of 3 mm, and subjected to heat treatment at 180° C. for 3 hours to obtain a glass fiber chopped strand (GF1) as the inorganic reinforcing material (D).

[Example 1-2] Production of Glass Fiber Chopped Strand (GF2)

The modified olefin wax water-dispersible emulsion (EM1a) produced in Example 1-1, the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.1 (mass ratio) to prepare a fiber-sizing agent.

Thereafter, in the same manner as in Example 1-1, glass fiber filaments were coated with the fiber-sizing agent to produce a glass fiber chopped strand (GF2).

[Example 1-3] Production of Glass Fiber Chopped Strand (GF3)

The modified olefin wax water-dispersible emulsion (EM1a) produced in Example 1-1, the polyolefin resin emulsion (B1), and the silane coupling agent (Z-6011, 3-aminopropyltriethoxysilane, manufactured by Dow Corning Toray Co., Ltd.) were blended at a solid content ratio of 8/2/0.1 (mass ratio) to prepare a fiber-sizing agent.

Thereafter, in the same manner as in Example 1-1, glass fiber filaments were coated with the fiber-sizing agent to produce a glass fiber chopped strand (GF3).

[Example 1-4] Production of Glass Fiber Chopped Strand (GF4)

The modified olefin wax water-dispersible emulsion (EM1a) produced in Example 1-1, the polyolefin resin emulsion (B1), and the silane coupling agent (Z-6011, 3-aminopropyltriethoxysilane, manufactured by Dow Corning Toray Co., Ltd.) were blended at a solid content ratio of 9/1/0.1 (mass ratio) to prepare a fiber-sizing agent.

Thereafter, in the same manner as in Example 1-1, glass fiber filaments were coated with the fiber-sizing agent to produce a glass fiber chopped strand (GF4).

[Example 1-5] Production of Glass Fiber Chopped Strand (GF5)

The modified olefin wax water-dispersible emulsion (EM1a) produced in Example 1-1, the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.05 (mass ratio) to prepare a fiber-sizing agent. Thereafter, in the same manner as in Example 1-1, glass fiber filaments were coated with the fiber-sizing agent to produce a glass fiber chopped strand (GF5).

[Example 1-6] Production of Glass Fiber Chopped Strand (GF6)

<Production of Modified Olefin Wax Water-Dispersible Emulsion (EM1b)>

A modified olefin wax water-dispersible emulsion (EM1b, solid concentration=30 mass %) was produced under the same conditions as in Example 1-1 except that the amount of sodium hydroxide was changed to 8.7 g (0.45 equivalent with respect to maleic anhydride of the acid-modified olefin wax (W1)). The acid-modified olefin wax (W1) in the water dispersion liquid included spherical particles, the average particle diameter among 100 particles was 10 μm, and little phase separation occurred after the dispersion liquid was left standing for 7 days.

<Production of Fiber-Sizing Agent and Glass Fiber Chopped Strand (GF6)>

The modified olefin wax water-dispersible emulsion (EM1b), the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.1 (mass ratio) to prepare a fiber-sizing agent.

Thereafter, in the same manner as in Example 1-1, glass fiber filaments were coated with the fiber-sizing agent to produce a glass fiber chopped strand (GF6).

[Example 1-7] Production of Glass Fiber Chopped Strand (GF7)

<Production of Modified Olefin Wax Water-Dispersible Emulsion (EM2)>

Except that the amounts of propylene and hydrogen introduced were adjusted, the same procedure as in Example 1-1 was carried out to obtain an unmodified olefin wax (a2).

A modified olefin wax (W2) as an acid-modified olefin wax was obtained by acid-modifying the unmodified olefin wax (a2) under the same conditions as in the case of the unmodified olefin wax (a1) except that the amount of maleic anhydride was changed to 15 g and the amount of di-t-butyl peroxide (hereinafter, abbreviated as DTBPO) was changed to 1.5 g. Table 2 shows the physical properties thereof.

The modified olefin wax (W2) was dispersed under the same conditions as in Example 1-1 to produce a modified olefin wax water-dispersible emulsion (EM2, solid concentration=30 mass %). The acid-modified olefin wax (W2) in the water dispersion liquid included spherical particles, the average particle diameter among 100 particles was 5 μm, and little phase separation occurred after the dispersion liquid was left standing for 7 days.

<Production of Fiber-Sizing Agent and Glass Fiber Chopped Strand (GF7)>

The modified olefin wax water-dispersible emulsion (EM2), the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.1 (mass ratio) to prepare a fiber-sizing agent.

Thereafter, in the same manner as in Example 1-1, glass fiber filaments were coated with the fiber-sizing agent to produce a glass fiber chopped strand (GF7).

[Example 1-8] Production of Glass Fiber Chopped Strand (GF8)

<Production of Modified Olefin Wax Water-Dispersible Emulsion (EM3)>

The amounts of propylene and hydrogen introduced were adjusted in Example 1-1 to obtain an unmodified olefin wax (a3).

500 g of the unmodified olefin wax (a3) was put in a glass reaction vessel, and melted in a nitrogen atmosphere at 160° C. Subsequently, dry air was continuously supplied at a rate of 1 L/min over 2 hours. Thereafter, the olefin wax was further heated and reacted for 1 hour, then degassed in a molten state in vacuum at 10 mmHg for 0.5 hours to remove volatile components, and then cooled to obtain a modified olefin wax (W3) as an oxidized olefin wax. Table 2 shows the physical properties thereof.

The modified olefin wax (W3) was dispersed under the same conditions as in the case of the modified olefin wax (W2) to produce a modified olefin wax water-dispersible emulsion (EM3, solid concentration=30 mass %). The modified olefin wax (W3) in the water dispersion liquid included spherical particles, the average particle diameter among 100 particles was 5 μm, and little phase separation occurred after the dispersion liquid was left standing for 7 days.

<Production of Fiber-Sizing Agent and Glass Fiber Chopped Strand (GF8)>

The modified olefin wax water-dispersible emulsion (EM3), the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.1 (mass ratio) to prepare a fiber-sizing agent.

Thereafter, in the same manner as in Example 1-1, glass fiber filaments were coated with the fiber-sizing agent to produce a glass fiber chopped strand (GF8).

[Comparative Example 1-1] Production of Glass Fiber Chopped Strand (GF9)

The modified olefin wax water-dispersible emulsion (EM1a), the polyolefin resin emulsion (B1), and the silane coupling agent (Z-6011, 3-aminopropyltriethoxysilane, manufactured by Dow Corning Toray Co., Ltd.) were blended at a solid content ratio of 0.5/9.5/0.1 (mass ratio) to prepare a fiber-sizing agent.

Thereafter, in the same manner as in Example 1-1, glass fiber filaments were coated with the fiber-sizing agent to produce a glass fiber chopped strand (GF9).

[Comparative Example 1-2] Production of Glass Fiber Chopped Strand (GF10)

The modified olefin wax water-dispersible emulsion (EM1a), the polyolefin resin emulsion (B1), and the silane coupling agent (Z-6011, 3-aminopropyltriethoxysilane, manufactured by Dow Corning Toray Co., Ltd.) were blended at a solid content ratio of 9.5/0.5/0.1 (mass ratio) to prepare a fiber-sizing agent.

Thereafter, in the same manner as in Example 1-1, glass fiber filaments were coated with the fiber-sizing agent to produce a glass fiber chopped strand (GF10).

[Comparative Example 1-3] Production of Glass Fiber Chopped Strand (GF11)

<Production of Unmodified Olefin Wax Water-Dispersible Emulsion (EM4)>

The amounts of propylene and hydrogen introduced were adjusted in Example 1-1 to obtain an unmodified olefin wax (a4).

An unmodified olefin wax water-dispersible emulsion (EM4, solid concentration=30 mass %) was produced under the same conditions as in Example 1-1 except that 10.6 g of sodium hydroxide (0.55 equivalent with respect to maleic anhydride of the modified olefin wax (W1)) was changed to 106 g of polyoxyethylene lauryl ether and the modified olefin wax (W1) was changed to the unmodified olefin wax (a4). The unmodified olefin wax (a4) in the water dispersion liquid included spherical particles, the average particle diameter among 100 particles was 10 μm, and slight phase separation occurred after the dispersion liquid was left standing for 7 days.

<Production of Fiber-Sizing Agent and Glass Fiber Chopped Strand (GF11)>

The unmodified olefin wax water-dispersible emulsion (EM4), the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.1 (mass ratio) to prepare a fiber-sizing agent.

Thereafter, in the same manner as in Example 1-1, glass fiber filaments were coated with the fiber-sizing agent to produce a glass fiber chopped strand (GF11).

[Comparative Example 1-4] Production of Glass Fiber Chopped Strand (GF12)

<Production of Unmodified Olefin Wax Water-Dispersible Emulsion (EM5)>

The amounts of propylene and hydrogen introduced were adjusted in Example 1-1 to obtain an unmodified olefin wax (a5).

The unmodified olefin wax (a5) was dispersed under the same conditions as in Comparative Example 1-4 to produce an unmodified olefin wax water-dispersible emulsion (EM5, solid concentration=30 mass %). The unmodified olefin wax (a5) in the water dispersion liquid included spherical particles, the average particle diameter among 100 particles was 20 μm, and slight phase separation occurred after the dispersion liquid was left standing for 7 days.

<Production of Fiber-Sizing Agent and Glass Fiber Chopped Strand (GF12)>

The unmodified olefin wax water-dispersible emulsion (EM5), the polyolefin resin emulsion (B1), and the silane coupling agent (Z-6011, 3-aminopropyltriethoxysilane, manufactured by Dow Corning Toray Co., Ltd.) were blended at a solid content ratio of 5/5/0.1 (mass ratio) to prepare a fiber-sizing agent.

Thereafter, in the same manner as in Example 1-1, glass fiber filaments were coated with the fiber-sizing agent to produce a glass fiber chopped strand (GF12).

4. Production of Resin Composition

Examples of the resin composition will be described below. Tables 3 and 4 show the evaluation results.

Example 2-1

Using a co-rotating twin-screw extruder HK25D (Parker Corporation: ϕ25 mm, L/D=41), 70 parts by mass of an aromatic polycarbonate resin (PANLITE L-1225Y from Teijin Limited, 5%-loss-on-heat temperature: 480° C.) and 30 parts by mass of a glass fiber chopped strand (GF1) were melted and kneaded, and the mixture was extruded at a cylinder temperature of 280° C. to obtain a pelletized resin composition.

The obtained pellets were dried at 120° C. for 8 hours, and then subjected to injection molding at a cylinder temperature of 280° C., a screw rotation number of 60 rpm, an injection pressure of 130 MPa and a die temperature of 90° C. using an injection molding machine (NIIGATA NN100 from NIIGATA MACHINE TECHNO CO., LTD.). By subjecting the pellets to the injection molding, test pieces were prepared in conformity to respective JIS tests. The physical properties of the prepared test pieces were evaluated according to the methods described below.

(a) Charpy Impact Test

On the basis of JIS K-7111, the Charpy impact value $(J/m^2)$ of the prepared test piece was measured under the following conditions: the hammer weight was 2 J, the moment in a hammer rotation direction was 1.08 N·J, the hammer lift angle was 50°, the impact speed was 2.9 m/s, and the distance between a rotating shaft and a hitting point was 0.23 m.

Test pieces having a Charpy impact value of 15 $(J/m^2)$ or more were evaluated as being good.

(b) Evaluation of Surface Gloss Properties

The reflectance at 60° of the prepared test piece (100 mm×100 mm×4 mm) was measured using GLOSS METER GM-3D (MURAKAMI COLOR RESEARCH LABORATORY CO., LTD.). An average of measurements at a total five points on each of front and back surfaces in the vicinity of the gate was calculated.

A: The average of the reflectance at 60° is 80% or more.

B: The average of the reflectance at 60° is 70% or more and less than 80%.

C: The average of the reflectance at 60° is less than 70%.

Test pieces rated A or B were evaluated as being good.

(c) Evaluation of GF Handling Properties 70 parts by mass of an aromatic polycarbonate resin, 30 parts by mass of glass fiber, and 1 part by mass of a modified olefin wax (only Comparative Example 2-6) were put in a polypropylene bag, and the polypropylene bag was tightly sealed, and then shaken 100 times at normal temperature, followed by visually observing the state of looseness of the glass fiber chopped strand.

A: The original form is retained, and there is little attachment of glass fiber filaments to the wall surface of the bag.

B: The strand is slightly loosened, and there is little attachment of glass fiber filaments to the wall surface of the bag.

C: About a half of the strand is loosened, and there is significant attachment of glass fiber filaments to the wall surface of the bag.

Test pieces rated A or B were evaluated as being good.

Example 2-2

A resin composition was obtained by performing pelletization in the same manner as in Example 2-1 except that the glass fiber chopped strand (GF1) was changed to the glass fiber chopped strand (GF2). Test pieces were prepared by subjecting the pellets to injection molding in the same manner as in Example 2-1, and similar evaluation tests were conducted.

Example 2-3

A resin composition was obtained by performing pelletization in the same manner as in Example 2-1 except that the glass fiber chopped strand (GF1) was changed to the glass fiber chopped strand (GF3). Test pieces were prepared by subjecting the pellets to injection molding in the same manner as in Example 2-1, and similar evaluation tests were conducted.

Example 2-4

A resin composition was obtained by performing pelletization in the same manner as in Example 2-1 except that the glass fiber chopped strand (GF1) was changed to the glass fiber chopped strand (GF4). Test pieces were prepared by subjecting the pellets to injection molding in the same manner as in Example 2-1, and similar evaluation tests were conducted.

Example 2-5

A resin composition was obtained by performing pelletization in the same manner as in Example 2-1 except that the glass fiber chopped strand (GF1) was changed to the glass fiber chopped strand (GF5). Test pieces were prepared by subjecting the pellets to injection molding in the same manner as in Example 2-1, and similar evaluation tests were conducted.

Example 2-6

A resin composition was obtained by performing pelletization in the same manner as in Example 2-1 except that the glass fiber chopped strand (GF1) was changed to the glass fiber chopped strand (GF6). Test pieces were prepared by subjecting the pellets to injection molding in the same manner as in Example 2-1, and similar evaluation tests were conducted.

Example 2-7

A resin composition was obtained by performing pelletization in the same manner as in Example 2-1 except that the glass fiber chopped strand (GF1) was changed to the glass fiber chopped strand (GF7). Test pieces were prepared by subjecting the pellets to injection molding in the same manner as in Example 2-1, and similar evaluation tests were conducted.

Example 2-8

A resin composition was obtained by performing pelletization in the same manner as in Example 2-1 except that the glass fiber chopped strand (GF1) was changed to the glass fiber chopped strand (GF8). Test pieces were prepared by subjecting the pellets to injection molding in the same manner as in Example 2-1, and similar evaluation tests were conducted.

Comparative Example 2-1

A resin composition was obtained by performing pelletization in the same manner as in Example 2-1 except that the glass fiber chopped strand (GF1) was changed to the glass fiber chopped strand (GF9). Test pieces were prepared by subjecting the pellets to injection molding in the same manner as in Example 2-1, and similar evaluation tests were conducted.

Comparative Example 2-2

A resin composition was obtained by performing pelletization in the same manner as in Example 2-1 except that the glass fiber chopped strand (GF1) was changed to the glass fiber reinforcing material (GF10). Test pieces were prepared by subjecting the pellets to injection molding in the same manner as in Example 2-1, and similar evaluation tests were conducted.

Comparative Example 2-3

A resin composition was obtained by performing pelletization in the same manner as in Example 2-1 except that the glass fiber chopped strand (GF1) was changed to the glass fiber chopped strand (GF11). Test pieces were prepared by subjecting the pellets to injection molding in the same manner as in Example 2-1, and similar evaluation tests were conducted.

Comparative Example 2-4

A resin composition was obtained by performing pelletization in the same manner as in Example 2-1 except that the glass fiber chopped strand (GF1) was changed to the glass fiber chopped strand (GF12). Test pieces were prepared by subjecting the pellets to injection molding in the same manner as in Example 2-1, and similar evaluation tests were conducted.

Comparative Example 2-5

A resin composition was obtained by performing pelletization in the same manner as in Example 2-1 except that the glass fiber chopped strand (GF1) was changed to glass fiber for polycarbonate (Nitto Boseki Co., Ltd.: Chopped Strand CS(F)3PE455S). Test pieces were prepared by subjecting the pellets to injection molding in the same manner as in Example 2-1, and similar evaluation tests were conducted.

Comparative Example 2-6

A resin composition was obtained by performing pelletization in the same manner as in Example 2-1 except that the glass fiber chopped strand (GF1) was changed to glass fiber for polycarbonate (Nitto Boseki Co., Ltd.: Chopped Strand CS(F)3PE455S), to which the modified olefin wax (W1) had been added in an amount of 1 mass %. Test pieces were prepared by subjecting the pellets to injection molding in the same manner as in Example 2-1, and similar evaluation tests were conducted.

strand (GF10) obtained using a fiber-sizing agent in which the mass ration of (A)/(B) is excessively high is poor in surface gloss properties and GF handling properties.

The resin compositions of Comparative Examples 2-3 and 2-4 using the glass fiber chopped strands (GF11) and (GF12), respectively, obtained using a fiber-sizing agent

TABLE 3

|  |  |  |  | Unit | Example 2-1 | Example 2-2 | Example 2-3 | Example 2-4 | Example 2-5 | Example 2-6 | Example 2-7 | Example 2-8 |
|---|---|---|---|---|---|---|---|---|---|---|---|---|
| Inorganic reinforcing material (D) | Type |  |  | — | GF1 | GF2 | GF3 | GF4 | GF5 | GF6 | GF7 | GF8 |
|  | Ingredients of fiber-sizing agent | Modified olefin wax (A) | W1 | mass % | 2 | 5 | 8 | 9 | 5 | 5 |  |  |
|  |  |  | W2 | mass % |  |  |  |  |  |  | 5 |  |
|  |  |  | W3 | mass % |  |  |  |  |  |  |  | 5 |
|  |  |  | a4 | mass % |  |  |  |  |  |  |  |  |
|  |  |  | a5 | mass % |  |  |  |  |  |  |  |  |
|  |  | Average particle diameter |  | μm | 5 | 5 | 5 | 5 | 5 | 10 | 5 | 5 |
|  |  | Designation of water dispersion |  | — | EM1a | EM1a | EM1a | EM1a | EM1a | EM1b | EM2 | EM3 |
|  |  | Polyolefin resin (B) |  | mass % | 8 | 5 | 2 | 1 | 5 | 5 | 5 | 5 |
|  |  | Silane coupling agent (C) |  | mass % | 0.1 | 0.1 | 0.1 | 0.1 | 0.05 | 0.1 | 0.1 | 0.1 |
|  |  | Mass ratio (A)/(B) |  | — | 0.25 | 1 | 4 | 9 | 1 | 1 | 1 | 1 |
| Evaluation | Charpy impact strength |  |  | J/m² | 20 | 25 | 29 | 31 | 22 | 23 | 23 | 20 |
|  | Surface gloss properties |  |  | — | A | A | A | B | B | A | A | A |
|  | CF handling properties |  |  | — | A | A | B | B | B | A | A | A |

TABLE 4

|  |  |  |  | Unit | Comparative Example 2-1 | Comparative Example 2-2 | Comparative Example 2-3 | Comparative Example 2-4 | Comparative Example 2-5 | Comparative Example 2-6 |
|---|---|---|---|---|---|---|---|---|---|---|
| Inorganic reinforcing material (D) | Type |  |  | — | GF9 | GF10 | GF11 | GF12 | GF for polycarbonate | GF for polycarbonate + W1 (1%) added |
|  | Ingredients of fiber-sizing agent | Modified olefin wax (A) | W1 | mass % | 0.5 | 9.5 |  |  |  |  |
|  |  |  | W2 | mass % |  |  |  |  |  |  |
|  |  |  | W3 | mass % |  |  |  |  |  |  |
|  |  |  | a4 | mass % |  |  | 5 |  |  |  |
|  |  |  | a5 | mass % |  |  |  | 5 |  |  |
|  |  | Average particle diameter |  | μm | 5 | 5 | 10 | 20 |  |  |
|  |  | Designation of water dispersion |  | — | EM1a | EM1a | EM4 | EM5 |  |  |
|  |  | Polyolefin resin (B) |  | mass % | 9.5 | 0.5 | 5 | 5 |  |  |
|  |  | Silane coupling agent (C) |  | mass % | 0.1 | 0.1 | 0.1 | 0.1 |  |  |
|  |  | Mass ratio (A)/(B) |  | — | 0.05 | 19 | 1 | 1 |  |  |
| Evaluation | Charpy impact strength |  |  | J/m² | 13 | 24 | 12 | 11 | 10 | 11 |
|  | Surface gloss properties |  |  | — | B | C | B | B | A | C |
|  | CF handling properties |  |  | — | A | C | C | C | A | A |

As shown in Table 3, the resin compositions of Examples 2-1 to 2-8 including the glass fiber chopped strand (D) obtained using a fiber-sizing agent in which the mass ratio (A)/(B) is within a predetermined range each have high impact strength and good surface gloss properties and handling properties.

On the other hand, as shown in Table 4, the resin composition of Comparative Example 2-1 including the glass fiber chopped strand (GF9) obtained using a fiber-sizing agent in which the mass ration of (A)/(B) is excessively low is poor not only in surface gloss properties but also in impact resistance. The resin composition of Comparative Example 2-2 including the glass fiber chopped containing an unmodified olefin wax instead of the modified olefin wax (A) are poor in impact strength and GF handling properties.

Comparative Example 2-5 using a glass fiber chopped strand obtained using a fiber-sizing agent which does not contain the modified olefin wax (A) and the polyolefin resin (B) is poor in impact strength. Comparative Example 2-6 using a glass fiber chopped strand obtained using a fiber-sizing agent which contains the modified olefin wax (A), and does not contain the polyolefin resin (B) is poor in impact strength and surface gloss properties.

The present application claims priority based on Japanese Patent Application No. 2017-164633, filed on Aug. 29, 2017. The disclosure of specification of the patent application is incorporated herein by reference in its entirety.

INDUSTRIAL APPLICABILITY

The present invention can provide a fiber-sizing agent which can provide a molded article having excellent impact resistance and high surface gloss properties when the fiber-sizing agent is applied to an inorganic reinforcing material contained in a resin composition; an inorganic reinforcing material obtained using the fiber-sizing agent; and a resin composition obtained using the inorganic reinforcing material.

The invention claimed is:

1. A resin composition comprising an inorganic reinforcing material (D) and a resin (E),
    wherein the resin (E) includes a thermoplastic resin selected from the group consisting of a polycarbonate resin, a polyester resin and a polyamide resin,
    wherein the inorganic reinforcing material (D) comprises an inorganic reinforcing material (D') coated with a fiber-sizing agent, the fiber-sizing agent comprising a modified olefin wax (A), an unmodified polyolefin resin (B) and a silane coupling agent (C),
    wherein the modified olefin wax (A) is a modified product of an ethylene-based polymer (a) having ethylene-derived structural units of 70 mol % to 100 mol % based on the total of all monomers forming the ethylene-based polymer (a),
    wherein the unmodified polyolefin resin (B) is an ethylene-based polymer (b) having ethylene-derived structural units of 70 mol % to 100 mol % based on the total of all monomers forming the ethylene-based polymer (b), and
    wherein a mass ratio (A)/(B) of the modified olefin wax (A) to the unmodified polyolefin resin (B) is in the range of 0.2 to 10.

2. The resin composition according to claim 1, wherein the mass ratio (A)/(B) is in the range of 0.5 to 10.

3. The resin composition according to claim 1, wherein the modified olefin wax (A) meets the following requirements (i) to (iv):
    (i) a number average molecular weight (Mn) in terms of polystyrene as measured by gel permeation chromatography (GPC) is in the range of 300 to 20,000;
    (ii) a softening point measured according to JIS K2207 is in the range of 70 to 170° C.;
    (iii) a density measured by a density-gradient tube method is in the range of 830 to 1200 kg/m$^3$; and
    (iv) an acid value is in the range of 10 to 200 mgKOH/g.

4. The resin composition according to claim 1, wherein the modified olefin wax (A) is a carboxylic acid-modified product of the ethylene-based polymer (a) or an oxide of the ethylene-based polymer (a).

5. The resin composition according to claim 1, wherein the modified olefin wax (A) is a maleic anhydride-modified product of the ethylene-based polymer (a).

6. A fiber-sizing agent comprising a modified olefin wax (A), a polyolefin resin (B) and a silane coupling agent (C),
    wherein a mass ratio (A)/(B) of the modified olefin wax (A) to the polyolefin resin (B) is in the range of 0.2 to 10, and
    the modified olefin wax (A) is contained as a water-dispersible emulsion having an average particle diameter of 0.1 to 30 μm.

7. The resin composition according to claim 1, wherein the modified olefin wax (A) meets the following requirement (i)':
    (i)' the number average molecular weight (Mn) in terms of polystyrene as measured by gel permeation chromatography (GPC) is in the range of 300 to 10,000.

8. The resin composition according to claim 1, wherein the inorganic reinforcing material (D') is a glass fiber filament, and
    the inorganic reinforcing material (D) is a glass fiber strand in which a plurality of the glass fiber filaments are sized by the fiber-sizing agent.

9. An inorganic reinforcing material (D) in which an inorganic reinforcing material (D') is coated with the fiber-sizing agent,
    wherein the inorganic reinforcing material (D') is a carbon fiber filament, and
    the inorganic reinforcing material (D) is a carbon fiber strand in which a plurality of the carbon fiber filaments are sized by the fiber-sizing agent, and
    wherein the fiber-sizing agent comprises a modified olefin wax (A), a polyolefin resin (B) and a silane coupling agent (C), and
    a mass ratio (A)/(B) of the modified olefin wax (A) to the polyolefin resin (B) is in the range of 0.2 to 10.

10. A molded article obtained from the resin composition according to claim 1.

* * * * *